United States Patent
Umeda et al.

(10) Patent No.: US 10,128,700 B2
(45) Date of Patent: Nov. 13, 2018

(54) ROTARY ELECTRIC MACHINE ARMATURE CORE

(71) Applicant: MITSUBISHI ELECTRIC CORPORATION, Chiyoda-ku (JP)

(72) Inventors: Takashi Umeda, Chiyoda-ku (JP); Akira Hashimoto, Chiyoda-ku (JP); Katsunori Oki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 196 days.

(21) Appl. No.: 15/128,196

(22) PCT Filed: Apr. 16, 2014

(86) PCT No.: PCT/JP2014/060837
§ 371 (c)(1),
(2) Date: Sep. 22, 2016

(87) PCT Pub. No.: WO2015/159389
PCT Pub. Date: Oct. 22, 2015

(65) Prior Publication Data
US 2017/0126075 A1    May 4, 2017

(51) Int. Cl.
*H02K 1/14*    (2006.01)
*H02K 15/02*    (2006.01)

(52) U.S. Cl.
CPC .......... *H02K 1/148* (2013.01); *H02K 15/022* (2013.01)

(58) Field of Classification Search
CPC ..................... H02K 1/148; H02K 15/022
See application file for complete search history.

(56) References Cited

U.S. PATENT DOCUMENTS 6,369,687 B1    4/2002  Akita
6,476,533 B2 *  11/2002 Akutsu ............... H02K 1/00
                                        310/216.003

(Continued)

FOREIGN PATENT DOCUMENTS

JP    2002-281697 A    9/2002
JP    2008/104325 A    5/2008

(Continued)

OTHER PUBLICATIONS

German Office Action dated Jul. 5, 2018 in German Application No. 11 2014 006 468.8 with English translation.

*Primary Examiner* — Robert W Horn
(74) *Attorney, Agent, or Firm* — Xsensus, LLP

(57) ABSTRACT

A core segment linked body is configured by linking a plurality of core segments by inserting first shafts of first core segments into first slots of core segments near a first longitudinal end thereof, and inserting second shafts of core segments near the first longitudinal end thereof into second slots of the first core segments, the linked core segments are expandable and contractible between an expanded position in which an interval between the magnetic pole tooth is expanded and a contracted position in which the interval is reduced by the first shafts being guided by the first slots and the second shafts being guided by the second slots, and central axes of the first shafts and the second shafts are: offset in a longitudinal direction of the back yoke in the expanded position; and positioned collinearly in a direction of lamination in the contracted position.

10 Claims, 18 Drawing Sheets

(56) References Cited

U.S. PATENT DOCUMENTS

| | | | | |
|---|---|---|---|---|
| 6,646,535 B2* | 11/2003 | Miyake | H02K 1/148 | 310/216.074 |
| 6,700,295 B2* | 3/2004 | Kanno | H02K 1/24 | 29/598 |
| 7,120,985 B2* | 10/2006 | Nouzumi | H02K 1/148 | 29/596 |
| 8,677,608 B2* | 3/2014 | Akita | H02K 1/148 | 29/604 |
| 9,059,611 B2* | 6/2015 | Li | H02K 1/148 | |
| 9,136,735 B2* | 9/2015 | Hashimoto | H02K 1/148 | |
| 9,543,799 B2* | 1/2017 | Kim | H02K 3/522 | |
| 9,755,473 B2* | 9/2017 | Hsu | H02K 5/10 | |
| 2006/0066171 A1* | 3/2006 | Yanoi | H02K 1/148 | 310/254.1 |
| 2010/0007236 A1 | 1/2010 | Sano et al. | | |
| 2010/0066193 A1 | 3/2010 | Noda | | |
| 2011/0316365 A1* | 12/2011 | Kim | H02K 1/18 | 310/43 |
| 2014/0139068 A1* | 5/2014 | Shijo | H02K 1/148 | 310/216.009 |
| 2014/0361657 A1* | 12/2014 | Vohlgemuth | H02K 1/148 | 310/216.009 |
| 2014/0368080 A1* | 12/2014 | Miyajima | H02K 1/148 | 310/216.065 |
| 2015/0207367 A1* | 7/2015 | Feldmann | H02K 15/022 | 310/208 |
| 2015/0364954 A1* | 12/2015 | Senoo | H02K 1/148 | 310/216.009 |
| 2016/0226322 A1* | 8/2016 | Li | H02K 1/146 | |
| 2017/0077768 A1* | 3/2017 | Hashimoto | H02K 1/148 | |
| 2017/0117761 A1* | 4/2017 | Takiguchi | H02K 1/148 | |
| 2017/0126075 A1* | 5/2017 | Umeda | H02K 1/148 | |
| 2017/0149295 A1* | 5/2017 | Kawasaki | H02K 1/148 | |
| 2018/0048194 A1* | 2/2018 | Endo | H02K 1/148 | |

FOREIGN PATENT DOCUMENTS

| | | |
|---|---|---|
| JP | 2010-41893 A | 2/2010 |
| JP | 2010-98938 A | 4/2010 |
| WO | 2011/125199 A1 | 10/2011 |
| WO | 2012/095987 A1 | 7/2012 |

* cited by examiner

ROTARY ELECTRIC MACHINE ARMATURE CORE

TECHNICAL FIELD

The present invention relates to a construction of an armature core that is used in a rotary electric machine, and a particular object thereof is to improve productivity, material yield, and characteristics, etc., of the armature core.

BACKGROUND ART

Conventional rotary electric machine armature cores are configured by linking a plurality of core segments into an annular shape, the core segments having an approximate T shape that has a back yoke portion and a magnetic pole tooth portion that protrudes from the back yoke portion. Each of the core segments is configured by laminating a plurality of approximately T-shaped core laminations. When manufacturing armature cores, materials yield has been improved by arranging the core laminations in a staggered pattern such that the magnetic pole tooth portions of first core laminations are positioned between magnetic pole tooth portions of second core laminations and punching out two straight rows together (see Patent Literature 1 and 2, for example).

CITATION LIST

Patent Literature

Patent Literature 1: International Publication No. WO/2011/125199 (Pamphlet)
Patent Literature 2: International Publication No. WO/2012/095987 (Pamphlet)

SUMMARY OF THE INVENTION

Problem to be Solved by the Invention

In the conventional armature core that is disclosed in Patent Literature 1, notches in which magnetic pole tooth portion tips of the first core laminations are accommodated are disposed on magnetic pole tooth portion roots of the second core laminations in order to obtain two staggered straight rows together. Because of that, if the notches are enlarged, it leads to reductions in driving torque or deterioration of torque pulsation (torque ripples), etc.

In the conventional armature core that is disclosed in Patent Literature 2, because a construction is adopted in which the magnetic pole tooth portions are split and separated in order to obtain two staggered straight rows together, labor time for manufacturing (pressing) the armature core is increased. The pressing die is also increased in size, leading to increases in costs. In addition, because it is necessary to assemble and fix the split magnetic pole tooth portions, productivity is reduced.

The present invention aims to solve the above problems and an object of the present invention is to provide an armature core for a rotary electric machine that can improve materials yield, and that can improve productivity, without lowering characteristics of the rotary electric machine, even if widths of magnetic pole tooth portions are increased.

Means for Solving the Problem

A rotary electric machine armature core according to the present invention includes a core segment linked body that is configured by linking a plurality of core segments that each include a back yoke and a magnetic pole tooth that protrudes from a central portion of the back yoke. The core segments are configured by laminating and integrating a plurality of core laminations that have a back yoke portion and a magnetic pole tooth portion, the back yoke is configured by stacking and integrating the back yoke portions, the magnetic pole tooth is configured by stacking and integrating the magnetic pole tooth portions, and the core laminations have at least: a first core lamination on which a first shaft is formed near a first longitudinal end of the back yoke portion; a second core lamination on which a first slot is formed near a second longitudinal end of the back yoke portion; a third core lamination on which a second shaft is formed near a second longitudinal end of the back yoke portion; and a fourth core lamination on which a second slot is formed near a first longitudinal end of the back yoke portion. The core segment linked body is configured by linking a plurality of the core segments by inserting the first shafts of first core segments into the first slots of adjacent core segments near a first longitudinal end of the back yoke, and inserting the second shafts of the adjacent core segments near the first longitudinal end of the back yoke into the second slots of the first core segments, the linked core segments are expandable and contractible between an expanded position in which an interval between the magnetic pole tooth is expanded and a contracted position in which the interval is reduced by the first shafts being guided by the first slots and the second shafts being guided by the second slots, and central axes of the first shafts and the second shafts are: offset in a longitudinal direction of the back yoke in the expanded position; and positioned collinearly in a direction of lamination in the contracted position.

Effects of the Invention

In the rotary electric machine armature core according to the present invention, because the linked core segments are displaceable between the expanded position and the contracted position, core laminations can be easily obtained as staggered straight row pairs by manufacturing the core laminations in a positional relationship that corresponds to a state in which the core segment linked bodies are positioned in the expanded position, enabling materials yield to be improved. Thus, even if widths of magnetic pole tooth portions are increased, materials yield can be improved without lowering characteristics of the rotary electric machine, enabling productivity to be improved.

DESCRIPTION OF EMBODIMENTS

Preferred embodiments of a rotary electric machine armature core according to the present invention will now be explained with reference to the drawings.

Embodiment 1

Figure 1:
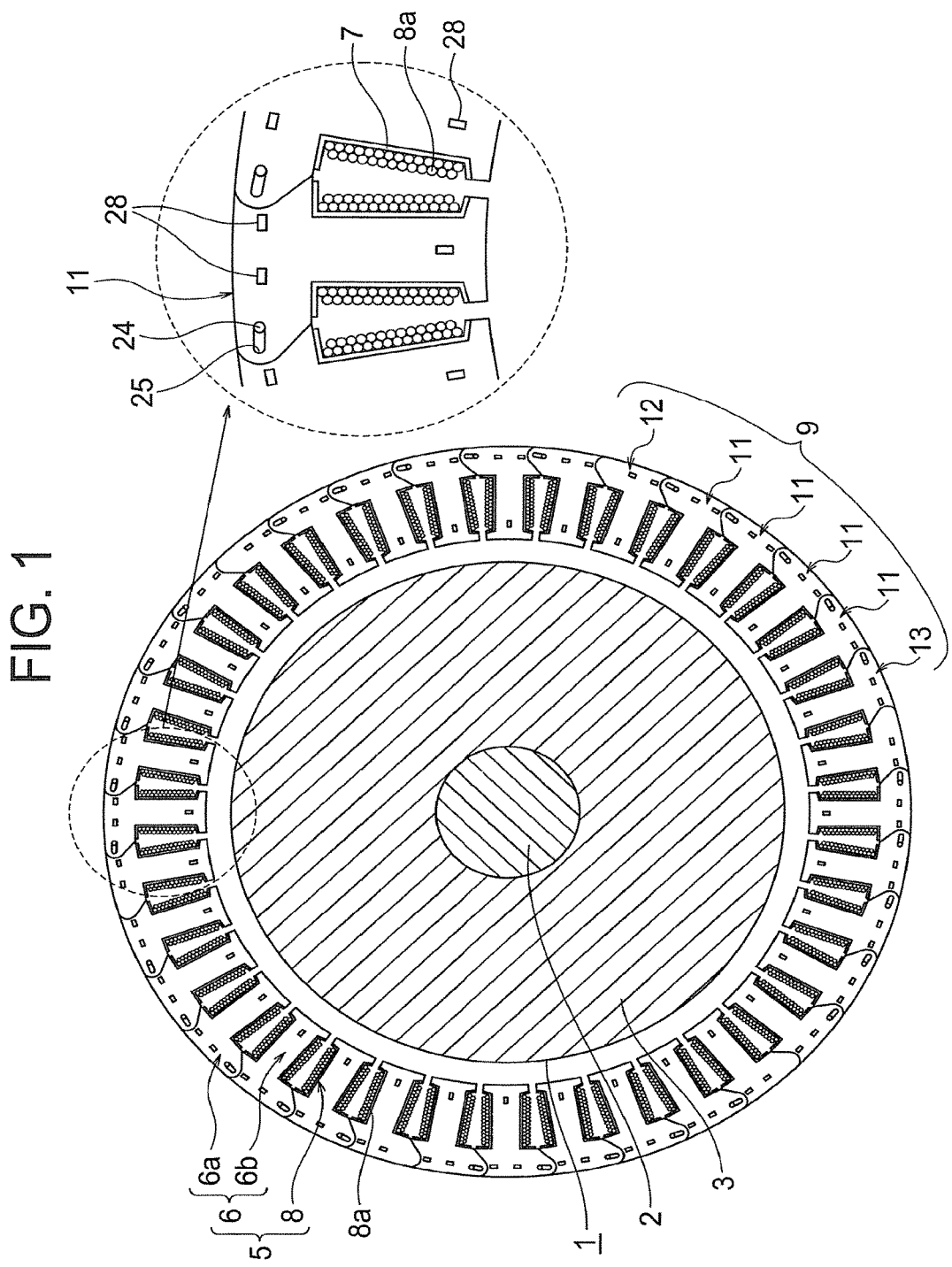
FIG. 1 is a plan that shows a rotary electric machine according to Embodiment 1 of the present invention.
Figure 2:
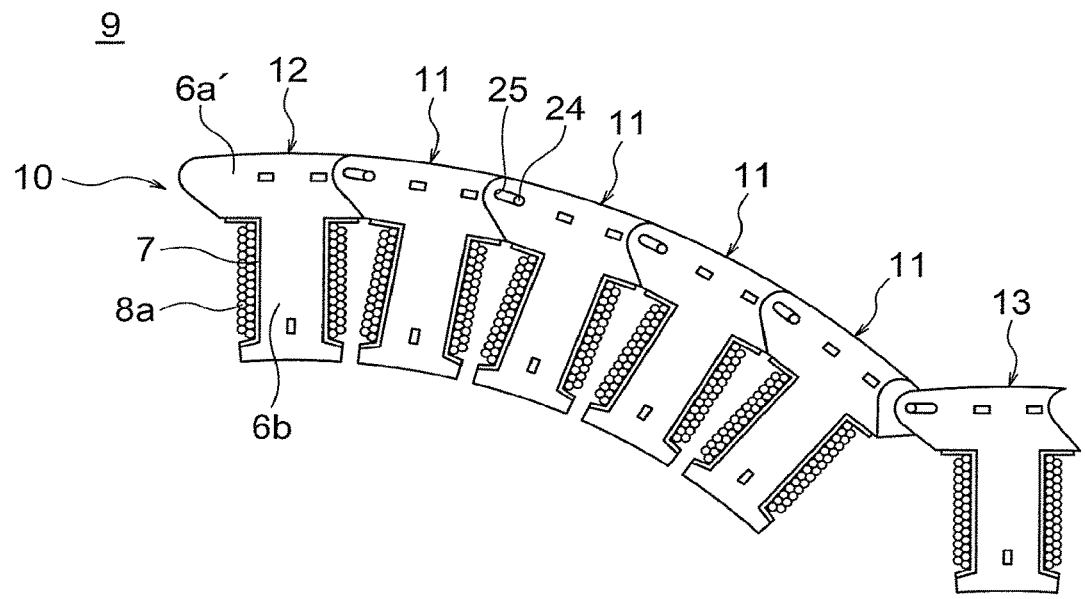
FIG. 2 is a plan that shows an armature segment that constitutes part of an armature of the rotary electric machine according to Embodiment 1 of the present invention.
Figure 3:
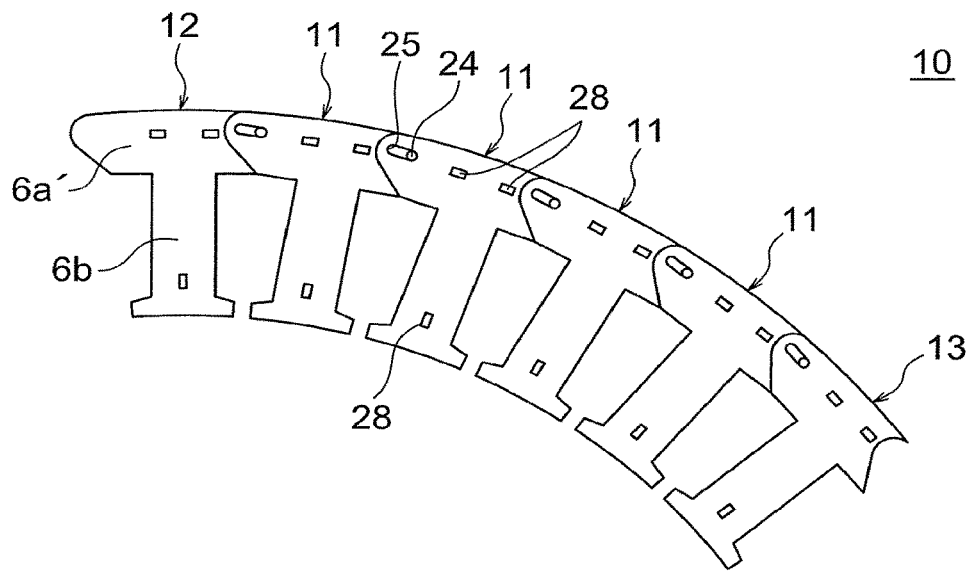
FIG. 3 is a plan that shows a core segment linked body that constitutes part of the armature segment of the rotary electric machine according to Embodiment 1 of the present invention.
Figure 4:
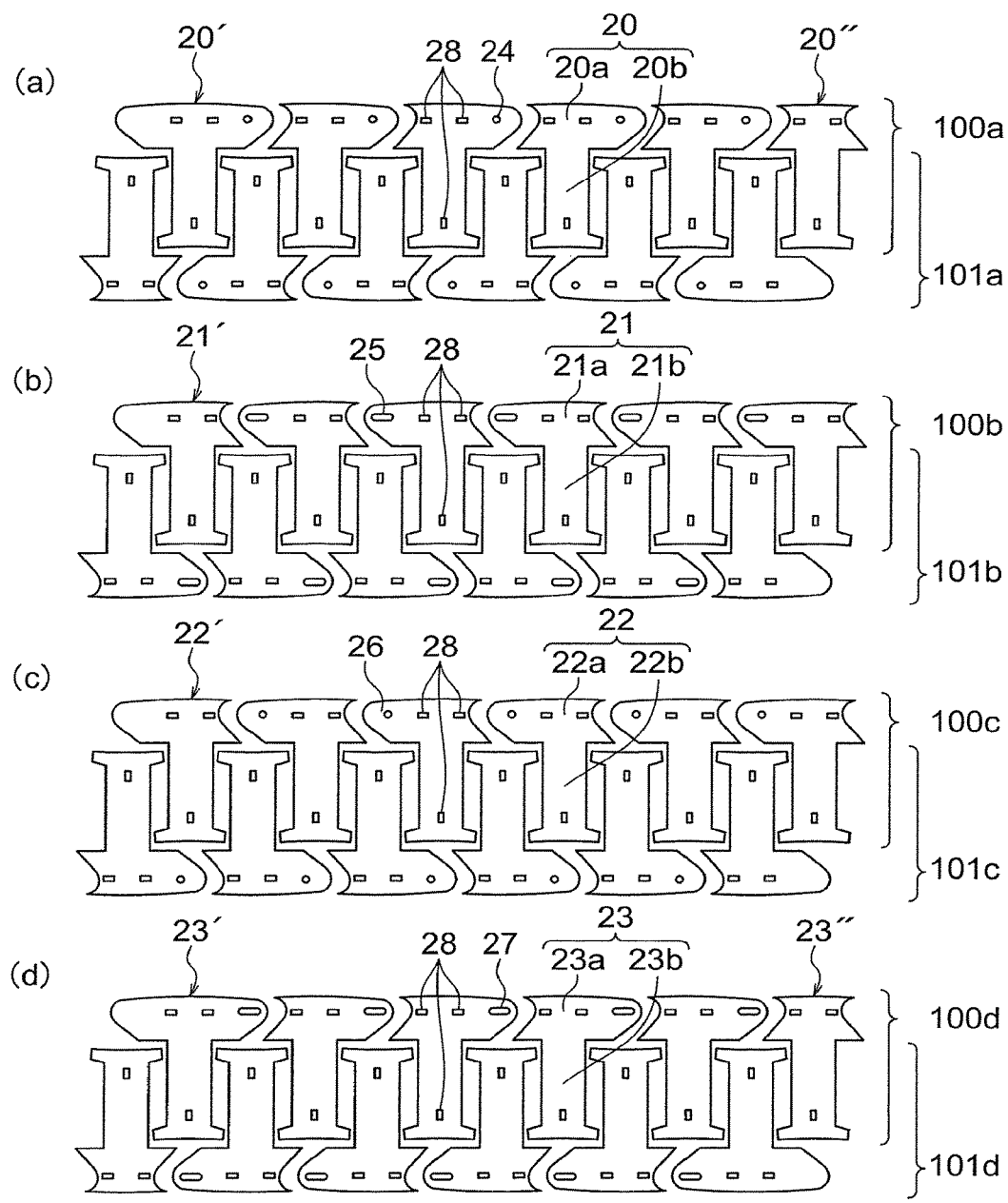
FIG. 4 shows diagrams that explain materials yield of core laminations that constitute part of the core segment linked body of the rotary electric machine according to Embodiment 1 of the present invention.
Figure 5:
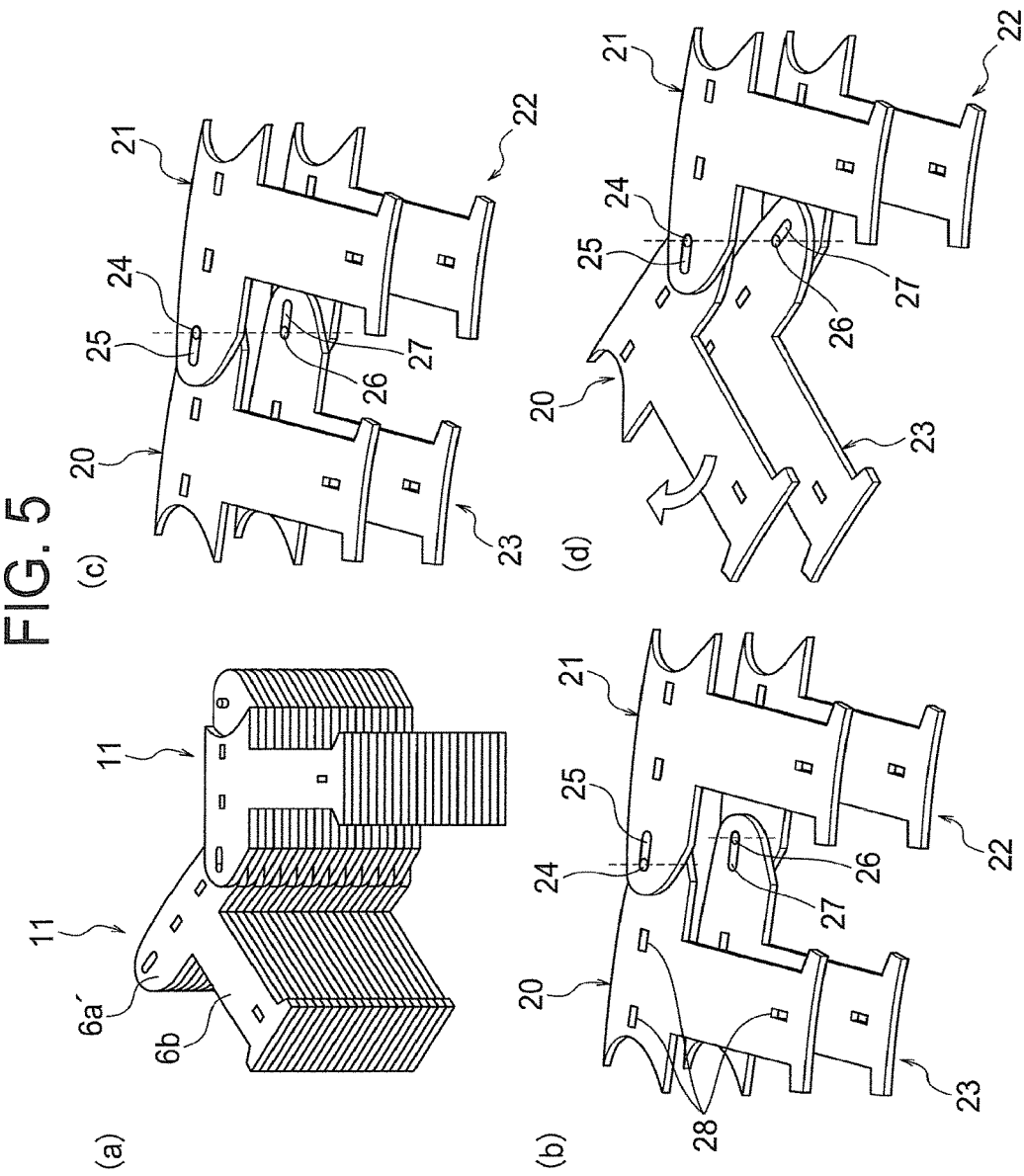
FIG. 5 shows diagrams that explain a linked state between first core segments of the core segment linked body of the rotary electric machine according to Embodiment 1 of the present invention.
Figure 6:
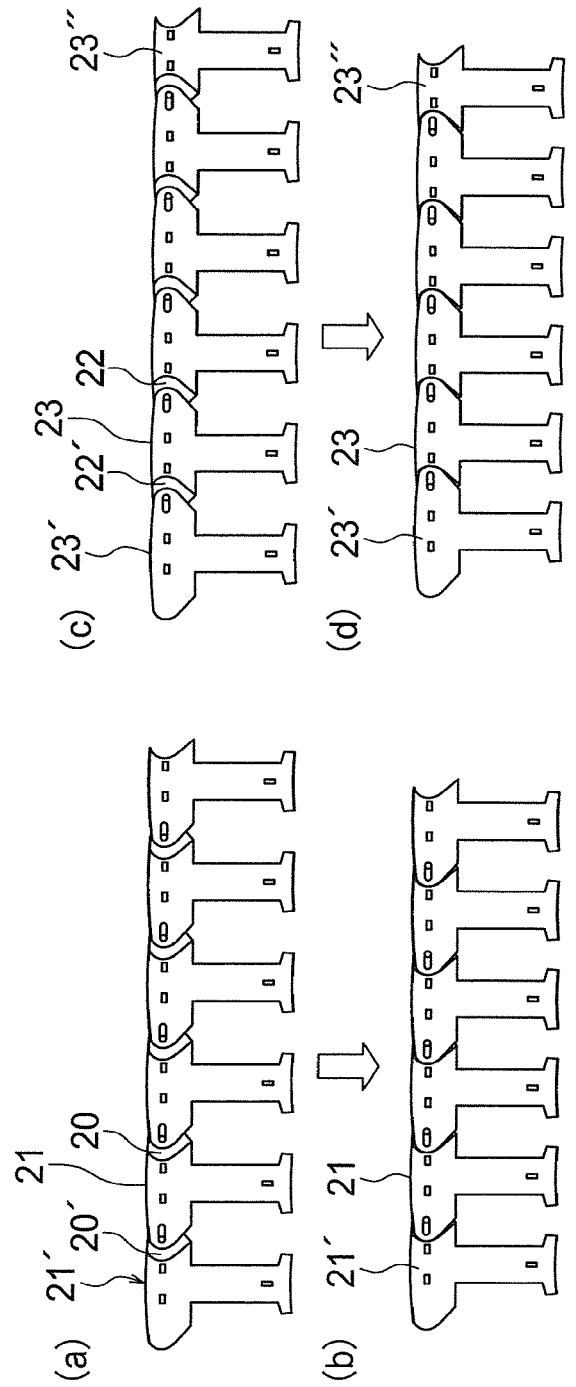
FIG. 6 shows plans that explain expanding and contracting operations of the core segment linked body that constitutes part of the armature segment of the rotary electric machine according to Embodiment 1 of the present invention.
Figure 7:
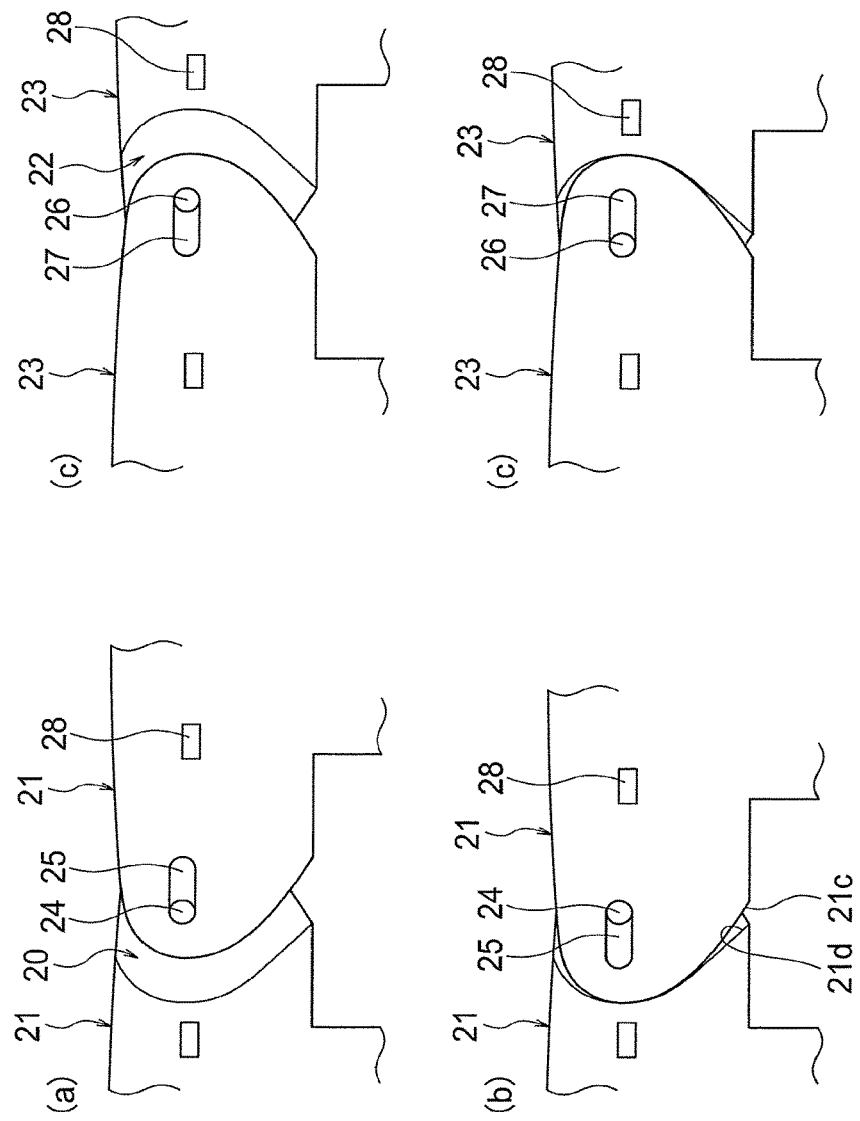
FIG. 7 shows partial enlargements that explain the expanding and contracting operations of the core segment linked body that constitutes part of the armature segment of the rotary electric machine according to Embodiment 1 of the present invention.

FIG. 1 is a plan that shows a rotary electric machine according to Embodiment 1 of the present invention, FIG. 2 is a plan that shows an armature segment that constitutes part of an armature of the rotary electric machine according to Embodiment 1 of the present invention, FIG. 3 is a plan that shows a core segment linked body that constitutes part of the armature segment of the rotary electric machine according to Embodiment 1 of the present invention, FIG. 4 shows diagrams that explain materials yield of core laminations that constitute part of the core segment linked body of the rotary electric machine according to Embodiment 1 of the present invention, FIG. 5 shows diagrams that explain a linked state between first core segments of the core segment linked body of the rotary electric machine according to Embodiment 1 of the present invention, FIG. 6 shows plans that explain expanding and contracting operations of the core segment linked body that constitutes part of the armature segment of the rotary electric machine according to Embodiment 1 of the present invention, and FIG. 7 shows partial enlargements that explain the expanding and contracting operations of the core segment linked body that constitutes part of the armature segment of the rotary electric machine according to Embodiment 1 of the present invention.

In FIG. 1, a rotary electric machine includes: a rotor 1 that is fixed to a rotating shaft 2 that is rotatably supported by a housing (not shown) so as to be disposed inside the housing; and an armature 5 that is held by the housing so as to surround the rotor 1 such that a constant air gap is interposed between the armature 5 and the rotor 1.

The rotor 1 includes: the rotating shaft 2; and a rotor core 3 that is fixed to the rotating shaft 2, which is inserted at a central position thereof. In addition, a plurality of magnets (not shown) are disposed on the outer circumferential surface of the rotor core 3 at a uniform pitch in a circumferential direction.

The armature 5 includes: an armature core 6 in which a plurality of magnetic pole teeth 6*b*, in this case thirty-six, are respectively disposed so as to project radially inward from an inner circumferential wall surface of an annular back yoke 6a at a uniform pitch in a circumferential direction; and an armature coil 8 that is constituted by coils 8a that are produced by winding a conductor wire onto each of the magnetic pole teeth 6b so as to have insulators 7 interposed.

The armature 5 is configured into an annular shape by arranging six armature segments 9 in a circumferential direction, the armature segments 9 being configured into circular arc shapes that are shown in FIG. 2. The armature segments 9 are constituted by: core segment linked bodies 10 that are configured into circular arc shapes; and the coils 8a, which are prepared by winding conductor wires onto each of the magnetic pole teeth 6b so as to have the insulators 7 interposed. The core segment linked bodies 10, as shown in FIG. 3, include: four first core segments 11 that are linked in a chain; a second core segment 12 that is linked to a left end of the four first core segments 11; and a third core segment 13 that is linked to a right end of the four first core segments 11.

The first core segments 11 are configured by laminating and integrating a laminated body of first core laminations 20, second core laminations 21, third core laminations 22, and fourth core laminations 23 in a plurality of layers.

The second core segments 12 are configured by laminating and integrating a laminated body of first core laminations 20', second core laminations 21', third core laminations 22', and fourth core laminations 23' in a plurality of layers.

The third core segments 13 are configured by laminating and integrating a laminated body of first core laminations 20", second core laminations 21, third core laminations 22, and fourth core laminations 23" in a plurality of layers.

The first core laminations 20, as shown in FIG. 4(a), are formed so as to have an approximate T shape that has: a first back yoke portion 20a; and a first magnetic pole tooth portion 20b that protrudes from a longitudinally central portion of the first back yoke portion 20a. A first longitudinal end portion of the first back yoke portion 20a bulges outward convexly, and a second end portion is hollowed out concavely. A first shaft 24 is formed so as to protrude from a first surface of the first longitudinal end portion of the first back yoke portion 20a. In addition, a plurality of crimping portions 28 are formed on the first back yoke portion 20a and the first magnetic pole tooth portion 20b.

The first core laminations 20' are configured in a similar or identical manner to the first core laminations 20 except that a second longitudinal end portion of a first back yoke portion 20a thereof bulges outward convexly. The first core laminations 20" are configured in a similar or identical manner to the first core laminations 20 except that a first longitudinal end portion of a first back yoke portion 20a thereof is hollowed out concavely.

The second core laminations 21, as shown in FIG. 4(b), are formed so as to have an approximate T shape that has: a second back yoke portion 21a; and a second magnetic pole tooth portion 21b that protrudes from a longitudinally central portion of the second back yoke portion 21a. A first longitudinal end portion of the second back yoke portion 21a is hollowed out concavely, and a vicinity of a second end bulges outward convexly. A first slot 25 that fits together with a first shaft 24 is formed rectilinearly on a second longitudinal end portion of the second back yoke portion 21a so as to have an aperture direction in a longitudinal direction of the second back yoke portion 21a. In addition, a plurality of crimping portions 28 are formed on the second back yoke portion 21a and the second magnetic pole tooth portion 21b.

The second core laminations 21' are configured in a similar or identical manner to the second core laminations 21 except that the first slot 25 is omitted.

The third core laminations 22, as shown in FIG. 4(c), are formed so as to have an approximate T shape that has: a third back yoke portion 22a; and a third magnetic pole tooth portion 22b that protrudes from a longitudinally central portion of the third back yoke portion 22a. A first longitudinal end portion of the third back yoke portion 22a is hollowed out concavely, and a second end portion bulges outward convexly. A second shaft 26 is formed so as to protrude from a first surface of the second longitudinal end portion of the third back yoke portion 22a. In addition, a plurality of crimping portions 28 are formed on the third back yoke portion 22a and the third magnetic pole tooth portion 22b.

The third core laminations 22' are configured in a similar or identical manner to the third core laminations 22 except that the second shaft 26 is omitted.

The fourth core laminations 23, as shown in FIG. 4(d), are formed so as to have an approximate T shape that has: a fourth back yoke portion 23a; and a fourth magnetic pole tooth portion 23b that protrudes from a longitudinally central portion of the fourth back yoke portion 23a. A vicinity of a first longitudinal end of the fourth back yoke portion 23a bulges outward convexly, and a second longitudinal end portion is hollowed out concavely. A second slot 27 that fits together with the second shaft 26 is formed rectilinearly on a first longitudinal end portion of the fourth back yoke portion 23a so as to have an aperture direction in a longitudinal direction of the fourth back yoke portion 23a. In addition, a plurality of crimping portions 28 are formed on the fourth back yoke portion 23a and the fourth magnetic pole tooth portion 23b.

The fourth core laminations 23' are configured in a similar or identical manner to the fourth core laminations 23 except that a second longitudinal end portion of a fourth back yoke portion 23a thereof bulges outward convexly. The fourth core laminations 23" are configured in a similar or identical manner to the fourth core laminations 23 except that a first longitudinal end portion of a fourth back yoke portion 23a thereof is hollowed out concavely.

As shown in FIG. 4(a), the first core laminations 20, 20', and 20" are punched out from a sheet of magnetic steel plate so as to form an arrangement known as a "staggered straight row pair" in which core lamination groups 100a and 101a that are lined up in single columns in a longitudinal direction of the first back yoke portions 20a such that the first magnetic pole tooth portions 20b are parallel are disposed in opposite directions such that the first magnetic pole tooth portions 20b of the core lamination group 100a are placed between the first magnetic pole tooth portions 20b of the core lamination group 101a.

Similarly, as shown in FIG. 4(b), the second core laminations 21 and 21' are punched out from a sheet of magnetic steel plate so as to form an arrangement known as a "staggered straight row pair" in which core lamination groups 100b and 101b that are lined up in single columns in a longitudinal direction of the second back yoke portions 21a such that the second magnetic pole tooth portions 21b are parallel are disposed in opposite directions such that the second magnetic pole tooth portions 21b of the core lamination group 100b are placed between the second magnetic pole tooth portions 21b of the core lamination group 101b.

Similarly, as shown in FIG. 4(c), the third core laminations 22 and 22' are punched out from a sheet of magnetic steel plate so as to form an arrangement known as a "staggered straight row pair" in which core lamination groups 100*c* and 101*c* that are lined up in single columns in a longitudinal direction of the third back yoke portions 22*a* such that the third magnetic pole tooth portions 22*b* are parallel are disposed in opposite directions such that the third magnetic pole tooth portions 22*b* of the core lamination group 100*c* are placed between the third magnetic pole tooth portions 22*b* of the core lamination group 101*c*.

Similarly, as shown in FIG. 4(*d*), the fourth core laminations 23, 23', and 23" are punched out from a sheet of magnetic steel plate so as to form an arrangement known as a "staggered straight row pair" in which core lamination groups 100*d* and 101*d* that are lined up in single columns in a longitudinal direction of the fourth back yoke portions 23*a* such that the fourth magnetic pole tooth portions 23*b* are parallel are disposed in opposite directions such that the fourth magnetic pole tooth portions 23*b* of the core lamination group 100*d* are placed between the fourth magnetic pole tooth portions 23*b* of the core lamination group 101*d*.

Moreover, the respective first through fourth core laminations of the core lamination groups 100*a*, 100*b*, 100*c*, 100*d*, 101*a*, 101*b*, 101*c*, and 101*d* are arranged rectilinearly at a spacing that corresponds to when the core segment linked bodies 10 are positioned in an expanded position (described below).

The core lamination groups 100*a*, 100*b*, 100*c*, and 101*d* and the core lamination groups 101*a*, 101*b*, 101*c*, and 100*d* are simultaneously punched out in an identical die in this manner, are stacked in an identical die, and are fixed by crimping at the crimping portions 28 to produce a core lamination linked body. A required number of the core lamination linked bodies are then stacked, and are fixed by crimping at the crimping portions 28 to produce a core segment linked body 10.

Here, the first through fourth core laminations 20, 21, 22, and 23 are stacked sequentially in order of a third core lamination 22, a fourth core lamination 23, a first core lamination 20, and a second core lamination 21 such that the first through fourth back yoke portions 20*a*, 21*a*, 22*a*, and 23*a* and the first through fourth magnetic pole tooth portions 20*b*, 21*b*, 22*b*, and 23*b* are stacked. This operation is performed repeatedly, and the first core segment 11 is formed by fixing the stacked plurality of first through fourth core laminations 20 through 23 by crimping at the crimping portions 28.

The first through fourth core laminations 20', 21', 22', and 23' are stacked sequentially in order of a third core lamination 22', a fourth core lamination 23', a first core lamination 20', and a second core lamination 21' such that the first through fourth back yoke portions 20*a*, 21*a*, 22*a*, and 23*a* and the first through fourth magnetic pole tooth portions 20*b*, 21*b*, 22*b*, and 23*b* are stacked. This operation is performed repeatedly, and the second core segment 12 is formed by fixing the stacked plurality of first through fourth core laminations 20', 21', 22', and 23' by crimping at the crimping portions 28.

The first through fourth core laminations 20", 21, 22, and 23" are stacked sequentially in order of a third core lamination 22, a fourth core lamination 23", a first core lamination 20", and a second core lamination 21 such that the first through fourth back yoke portions 20*a*, 21*a*, 22*a*, and 23*a* and the first through fourth magnetic pole tooth portions 20*b*, 21*b*, 22*b*, and 23*b* are stacked. This operation is performed repeatedly, and the third core segment 13 is formed by fixing the stacked plurality of first through fourth core laminations 20", 21, 22, and 23" by crimping at the crimping portions 28.

Moreover, in the first through third core segments 11, 12, and 13, the first through fourth back yoke portions 20*a*, 21*a*, 22*a*, and 23*a* are laminated and integrated to constitute back yokes 6*a'*, and the first through fourth magnetic pole tooth portions 20*b*, 21*b*, 22*b*, and 23*b* are laminated and integrated to constitute the magnetic pole teeth 6*b*. The magnetic pole teeth 6*b* protrude from longitudinally central portions of the back yokes 6*a'*.

As shown in FIG. 5(*a*), the first core segments 11 are linked together by the first shafts 24 being inserted inside the first slots 25, and by the second shafts 26 being inserted inside the second slots 27. Thus, when the aperture directions of the first and second slots 25 and 27 are in a parallel state, the first and second shafts 24 and 26 move so as to be guided by the first and second slots 25 and 27, and spacing between the magnetic pole teeth 6*b* of the two first core segments 11 expands and contracts.

As shown in FIG. 5(*b*), when the first shafts 24 come into contact with the second end portions of the first slots 25 and the second shafts 26 come into contact with the first end portions of the second slots 27, the spacing between the magnetic pole teeth 6*b* of the two first core segments 11 is maximized (the expanded position). In this expanded position, the central axes of the first shafts 24 and the second shafts 26 are offset in the aperture direction (left-right in FIG. 5(*b*)) of the first and second slots 25 and 27. As shown in FIG. 5(*c*), when the first shafts 24 come into contact with the first end portions of the first slots 25, and the second shafts 26 come into contact with the second end portions of the second slots 27, the spacing between the magnetic pole teeth 6*b* of the two first core segments 11 is minimized (contracted position). In this contracted position, the central axes of the first shafts 24 and the second shafts 26 are positioned collinearly in a direction of lamination of the core laminations. In other words, the central axes of the first shafts 24 and the second shafts 26 are coaxial. Thus, pivoting operation of the two first core segments 11 around the first shafts 24 and the second shafts 26 is enabled in the contracted position, as shown in FIG. 5(*d*).

In the expanded position, and between the expanded position and the contracted position, the two first core segments 11 are limited to only movement in the aperture directions of the first and second slots 25 and 27. When the first slots 25 are projected in the axial direction of the first shafts 24 and the second shafts 26 onto a common plane with the second slots 27 in the contracted position, the first slots 25 and the second slots 27 on the projected plane have a point-symmetrical aperture shape that has the point of intersection between the central axes of the first shafts 24 and the second shafts 26 and the projected plane as a center of symmetry. Thus, the movement operation between the expanded position and the contracted position and the pivoting operation in the contracted position are performed smoothly.

Moreover, in FIGS. 5(*b*) through 5(*d*), four first through fourth core laminations 20 through 23 are used to represent the linked state between the first core segments 11 to facilitate explanation.

The second core segment 12 and a first core segment 11, and a first core segment 11 and the third core segment 13 are also linked by the first shafts 24 being inserted into the first slots 25, and by the second shafts 26 being inserted into the second slots 27. Consequently, the second core segment 12 and a first core segment 11, and a first core segment 11 and the third core segment 13, operate in a similar manner to the way that the first core segments 11 operate with each other.

In the core segment linked body 10 that is configured in this manner, as shown in FIGS. 6(a) and 6(c) and FIGS. 7(a) and 7(c), the core segment linked body 10 is placed in the expanded position by placing the first shafts 24 in contact with the second end portions of the first slots 25, and placing the second shafts 26 in contact with the first end portions of the second slots 27, such that the first through third core segments 11, 12, and 13 expand rectilinearly.

As shown in FIGS. 6(b) and 6(d) and FIGS. 7(b) and 7(d), the core segment linked body 10 is placed in the contracted position by placing the first shafts 24 in contact with the first end portions of the first slots 25, and placing the second shafts 26 in contact with the second end portions of the second slots 27, such that the first through third core segments 11, 12, and 13 contract. At this point, the first core segments 11 are pivotable around the first shafts 24 and the second shafts 26.

In FIG. 7(b), an end portion 21c of the convex bulging portion of the second back yoke portion 21a of the second core lamination 21 comes into contact with an end portion 21d of the concave hollowed portion of the second back yoke portion 21a on a side of the neighboring second core lamination 21 near a magnetic pole tooth portion such that further pivoting is restricted. Here, the end portions 21c and 21d constitute a pivoting restricting portion. Moreover, in the first core laminations, an end portion of the convex bulging portion on the side of the first back yoke portion of a first core lamination near the magnetic pole tooth portion may be configured so as to come into contact with a concave hollowed portion of the first back yoke portion on the side of a neighboring first core lamination near the magnetic pole tooth portion. In addition, in the first through fourth core laminations, an end portion of the convex bulging portion on a side of the back yoke portion of a core lamination near a magnetic pole tooth portion may be configured so as to come into contact with an end portion of the concave hollowed portion on a side of the back yoke portion of a neighboring core lamination near a magnetic pole tooth portion.

Although not shown, in the second core segment 12 and the first core segment 11, an end portion of the convex bulging portion on a side of the second back yoke portion 21a of the second core lamination 21 near a magnetic pole tooth portion comes into contact with an end portion of the concave hollowed portion on a side of the second back yoke portion 21a of the neighboring second core lamination 21' near a magnetic pole tooth portion, for example, such that further pivoting is restricted. In the first core segment 11 and the third core segment 13, an end portion of the convex bulging portion on a side of the second back yoke portion 21a of the second core lamination 21 near a magnetic pole tooth portion comes into contact with an end portion of the concave hollowed portion on a side of the second back yoke portion 21a of the neighboring second core lamination 21 near a magnetic pole tooth portion, for example, such that further pivoting is restricted. As shown in FIG. 3, the core segment linked body 10 thereby becomes a circular arc shape.

Thus, for example, the core segment linked body 10 is set to the contracted position, and the first through third core segments 11, 12, and 13 are rotated to widen the interval between the magnetic pole teeth 6b. Next, the coils 8a are mounted to each of the magnetic pole teeth 6b so as to have the insulators 7 interposed. Next, the linked first through third core segments 11, 12, and 13 are pivoted around the first and second shafts 24 and 26 so as to narrow the interval between the magnetic pole teeth 6b, producing a circular arc-shaped core segment linked body 10. Next, six core segment linked bodies 10 are arranged circumferentially. At this point, the six core segment linked bodies 10 are linked into an annular shape by fitting the convex bulging portions of the back yokes 6a' of the second core segments 12 into the concave hollowed portions of the back yokes 6a' of the third core segments 13. Next, the six core segment linked bodies 10 that are linked into the annular shape are inserted into and fixed to a cylindrical frame by shrinkage fitting to produce the armature 5. The back yokes 6a' line up circumferentially to constitute the annular back yoke 6a. Moreover, the armature 5 may be produced by integrating the six core segment linked bodies 10 by welding, etc.

According to Embodiment 1, core segment linked bodies 10 are configured by linking first through third core segments 11, 12, and 13 that are each produced by laminating fourth core laminations 20, 20', 20", 21, 21', 22, 22', 23', and 23". The first through third core segments 11, 12, and 13 are linked by inserting first shafts 24 that are formed on first back yoke portions 20a of first core laminations 20 and 20' into first slots 25 that are formed on second back yoke portions 21a of second core laminations 21, and inserting second shafts 26 that are formed on third back yoke portions 22a of third core laminations 22 into second slots 27 that are formed on fourth back yoke portions 23a of fourth core laminations 23'.

When the core segment linked bodies 10 are placed in an expanded position, in which spacing between adjacent first through third core segments 11, 12, and 13 is maximized, aperture directions of the first and second slots 25 and 27 become parallel, and the central axes of the first shafts 24 and the second shafts 26 are offset in the aperture directions of the first and second slots 25 and 27. When the core segment linked bodies 10 are placed in a contracted position, in which spacing between the adjacent first through third core segments 11, 12, and 13 is at a minimum, the central axes of the first shafts 24 and the second shafts 26 become coaxial. Thus, in the contracted position, a pivoting operation around the first shafts 24 (the second shafts 26) is permitted among the displacing operations of the first through third core segments 11, 12, and 13, in addition to movement from the contracted position to the expanded position. In the expanded position and between the expanded position and the contracted position, the displacing operations of the first through third core segments 11, 12, and 13 are restricted to only movement operations in the aperture directions of the first and second slots 25 and 27. Consequently, handling of the core segment linked bodies 10 is improved, improving productivity of the armature 5.

Because the first through third core segments 11, 12, and 13 are pivotable around the first shafts 24 (and second shafts 26) in the contracted position, the core segment linked bodies 10 can be formed into a circular arc shape easily. In addition, when the first through third core segments 11, 12, and 13 are rotated around the first shafts 24 (and second shafts 26) so as to narrow the interval between the magnetic pole teeth 6b, an end portion 21c of the convex bulging portion on a side of the second back yoke portion 21a of the second core lamination 21 near the magnetic pole tooth portion comes into contact with an end portion 21d of the concave hollowed portion on a side of the second back yoke portion 21a of a second core lamination 21 near the magnetic pole tooth portion, for example, such that further pivoting is restricted. Thus, the core segment linked bodies 10 can be bent into a circular arc shape that has a desired curvature easily and accurately by increasing the processing precision of the second core laminations 21.

The first through third core segments 11, 12, and 13 are pivotable around the first shafts 24 (and second shafts 26) in the contracted position. Thus, because the interval between the magnetic pole teeth 6b can be widened by pivoting the first through third core segments 11, 12, and 13 around the first shafts 24 (and second shafts 26), workability when mounting the insulators 7 and the coils 8a to the core segment linked bodies 10 is improved, raising productivity of the armature 5.

The core segment linked bodies 10 are configured so as to be displaceable between the contracted position and the expanded position. Thus, during press molding, core lamination groups 100a, 100b, 100c, 100d, 101a, 101b, 101c, and 101d, in which first through fourth magnetic pole tooth portions 20b, 21b, 22b, and 23b are arranged in a single row in a width direction, can be laid out in staggered straight row pairs in which the first through fourth magnetic pole tooth portions 20b, 21b, 22b, and 23b intermesh with each other at a spacing between the magnetic pole tooth portions 13b that corresponds to when the core segment linked bodies 10 are in the expanded position. Consequently, materials yield can be increased, raising productivity of the armature 5.

Even if a distance between the magnetic pole teeth 6b when the core segment linked bodies 10 are in the expanded position is slightly wider than the maximum width of the magnetic pole teeth 6b, core lamination groups 100a, 100b, 100c, and 100d and core lamination groups 101a, 101b, 101c, and 101d can be laid out in staggered straight row pairs during press molding so as to avoid interference among the first through fourth magnetic pole tooth portions. Consequently, the materials yield can be increased, and it is also not necessary to form notches, eliminating reductions in properties of the armature 5. Here, the maximum width of the magnetic pole teeth 6b is a circumferential width of flange portions that protrude on two circumferential sides from the tip ends of the magnetic pole teeth 6b.

In addition, even if the distance between the magnetic pole teeth 6b when the core segment linked bodies 10 are in the expanded position is shorter than the maximum width of the magnetic pole teeth 6b, core lamination groups 100a, 100b, 100c, and 100d and core lamination groups 101a, 101b, 101c, and 101d can be laid out in staggered straight row pairs during press molding simply by disposing minimal notches on the magnetic pole tooth portions. Consequently, the materials yield can be increased, and reductions in properties of the armature 5 that result from the formation of the notches can be suppressed.

Moreover, in Embodiment 1 above, the first through third core segments are each produced by alternately laminating pairs of first and second core laminations and pairs of third and fourth core laminations, but it is not necessary to laminate the pairs of first and second core laminations and pairs of third and fourth core laminations alternately, and the first through third core segments may be produced by continuously laminating pairs of first and second core laminations, and then continuously laminating pairs of third and fourth core laminations, for example. In addition, it is also not necessary to make the number of pairs of first and second core laminations and the number of pairs third and fourth core laminations in the first through third core segments equal. In other words, the first through third core segments need only have one or more of each of the two types of pairs, i.e., the pairs of first and second core laminations and the pairs of third and fourth core laminations, and may be configured by stacking these in any order.

In Embodiment 1 above, core segment linked bodies are configured by linking six core segments, but the number of core segments that constitute the core segment linked bodies is not limited to six. If the core segment linked bodies are constituted by twelve core segments, for example, the armature core is constituted by three core segment linked bodies.

In Embodiment 1 above, all of the armature segments that constitute the armature core are constituted by core segment linked bodies that include six core segments, but the armature core may be constituted by a plurality of kinds of core segment linked bodies that are constituted by different numbers of core segments.

Embodiment 2

Figure 8:
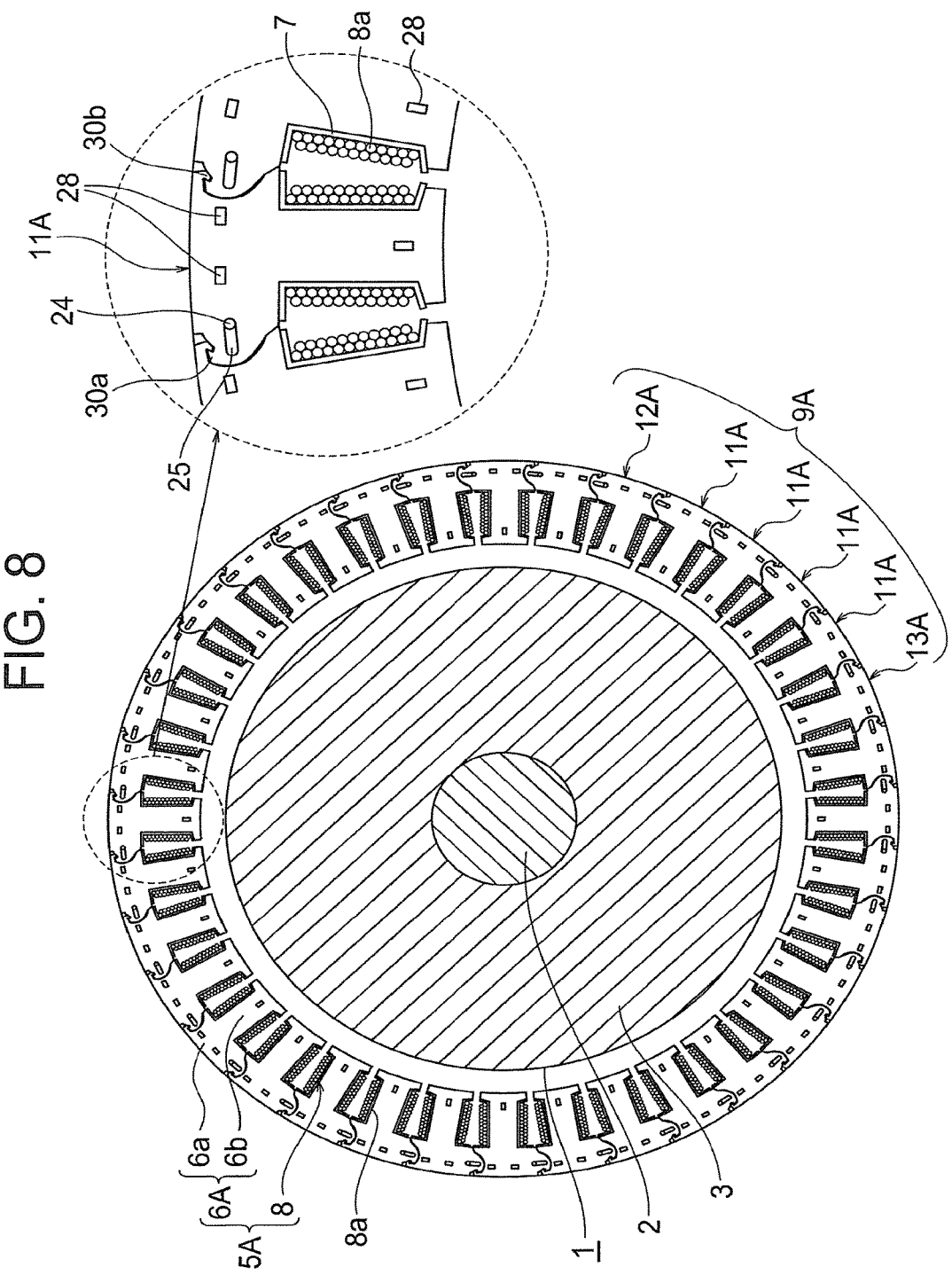
FIG. 8 is a plan that shows a rotary electric machine according to Embodiment 2 of the present invention.
Figure 9:
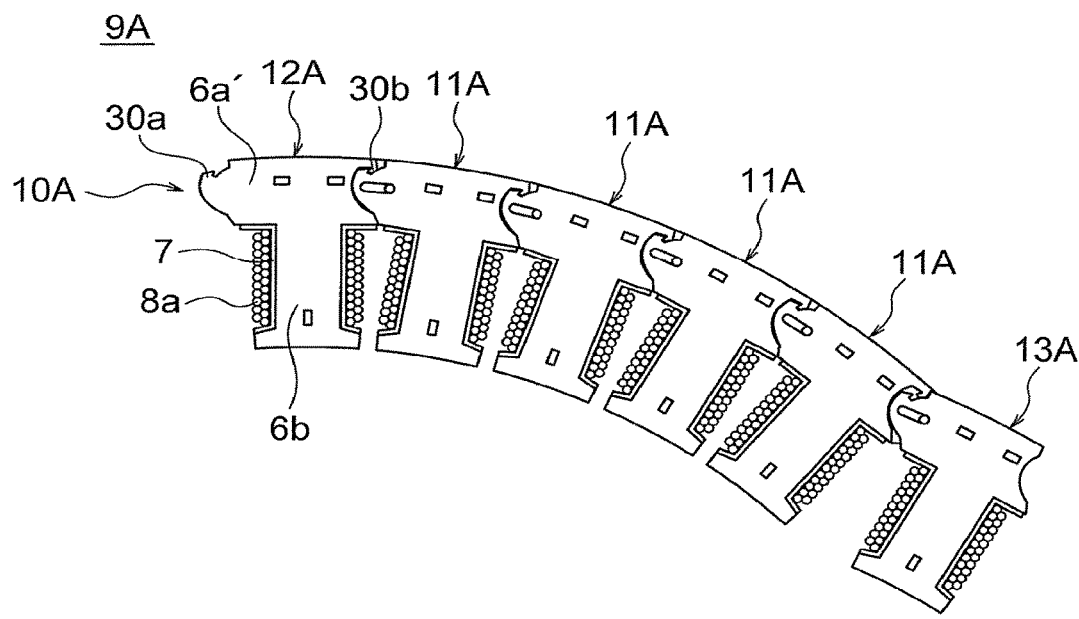
FIG. 9 is a plan that shows an armature segment that constitutes part of an armature of the rotary electric machine according to Embodiment 2 of the present invention.
Figure 10:
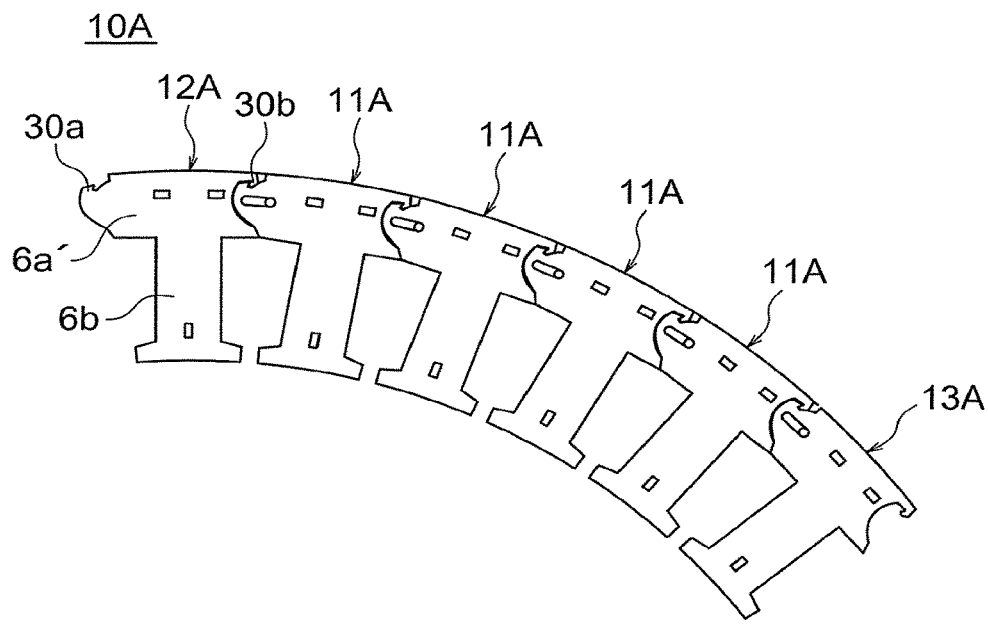
FIG. 10 is a plan that shows a core segment linked body that constitutes part of the armature segment of the rotary electric machine according to Embodiment 2 of the present invention.
Figure 11:
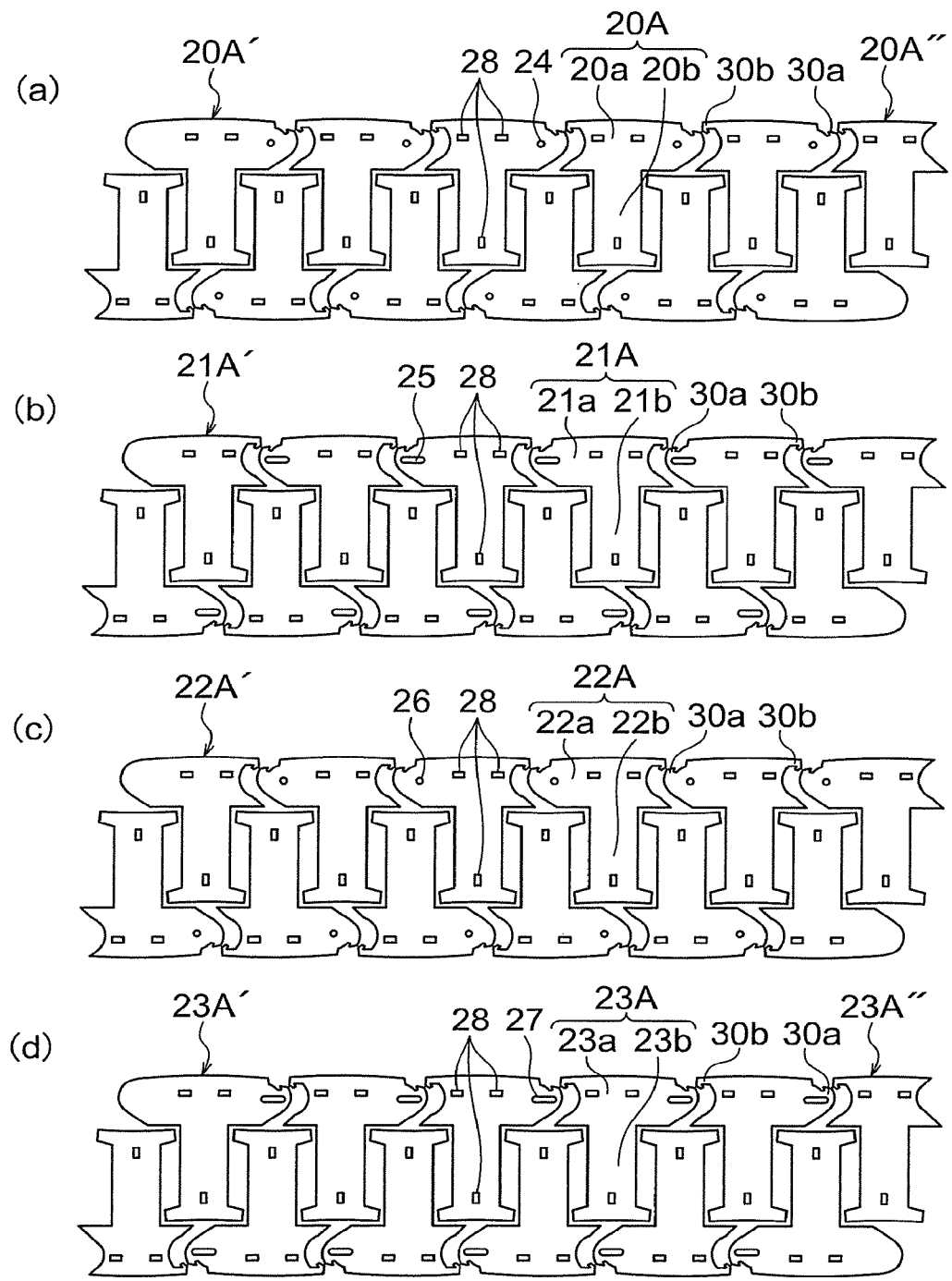
FIG. 11 shows diagrams that explain materials yield of core laminations that constitute part of the core segment linked body of the rotary electric machine according to Embodiment 2 of the present invention.
Figure 12:
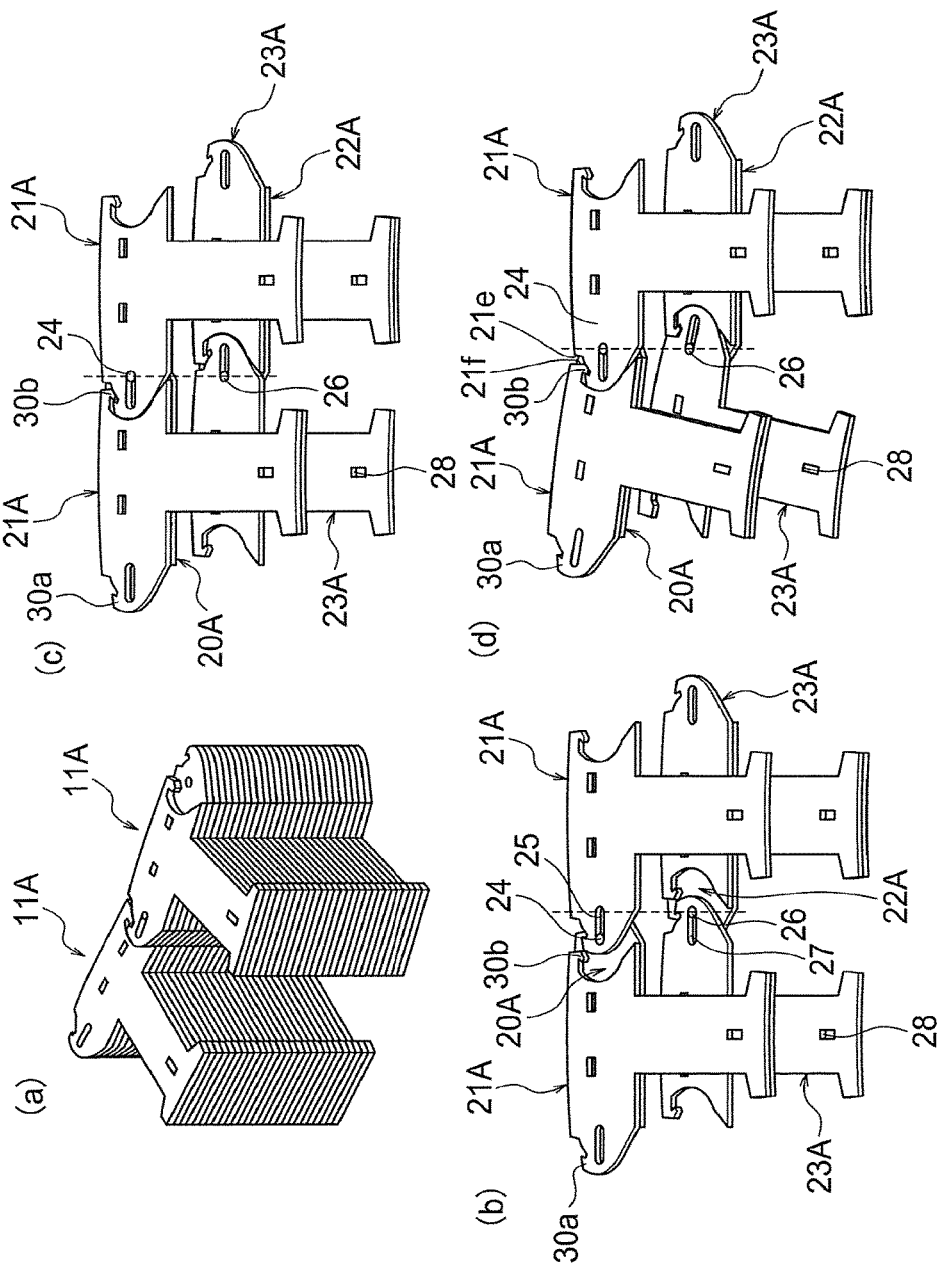
FIG. 12 shows diagrams that explain a linked state between first core segments of the core segment linked body of the rotary electric machine according to Embodiment 2 of the present invention.
Figure 13:
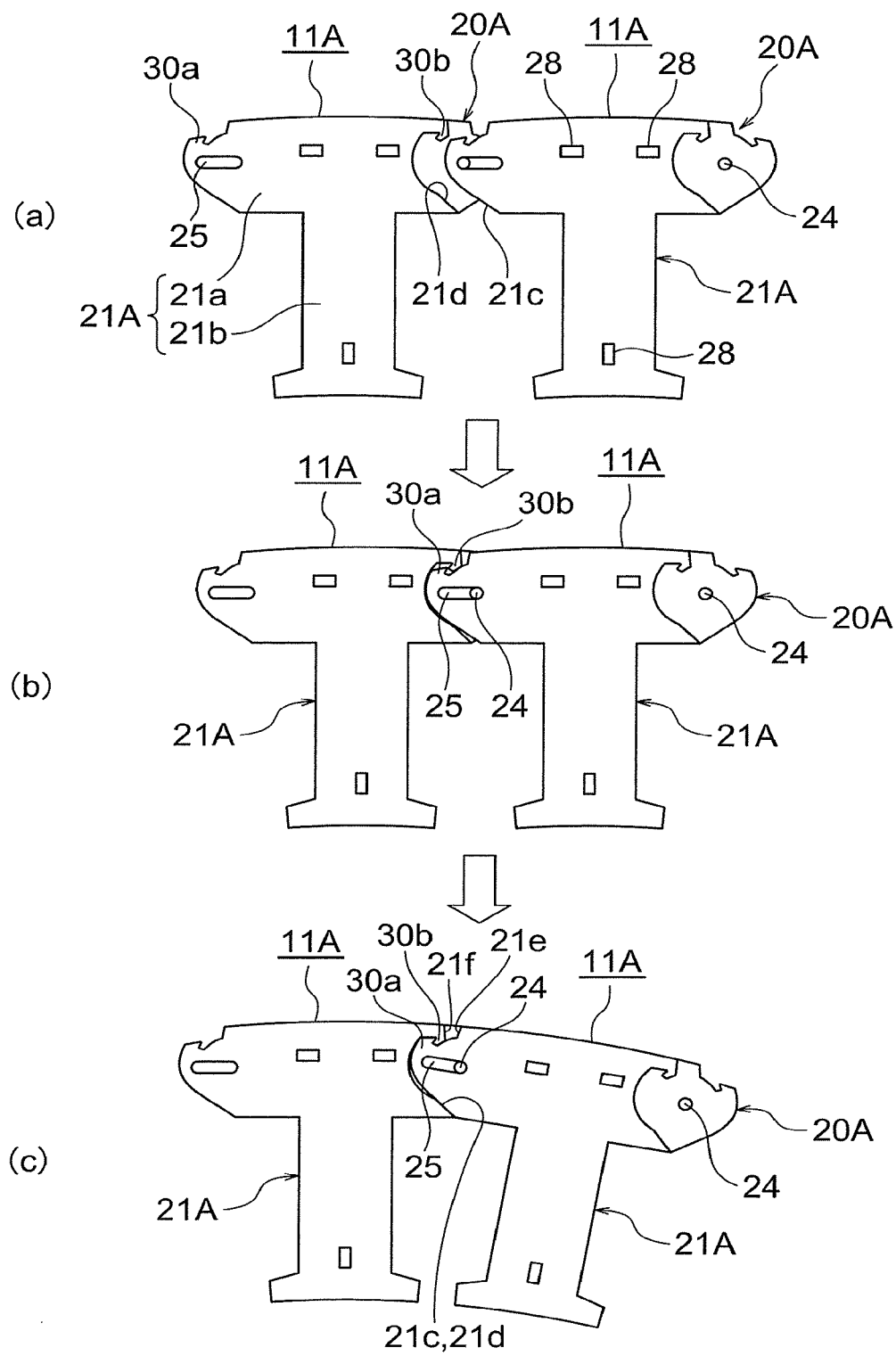
FIG. 13 shows plans that explain expanding and contracting operations of the core segment linked body that constitutes part of the armature segment of the rotary electric machine according to Embodiment 2 of the present invention.
Figure 14:
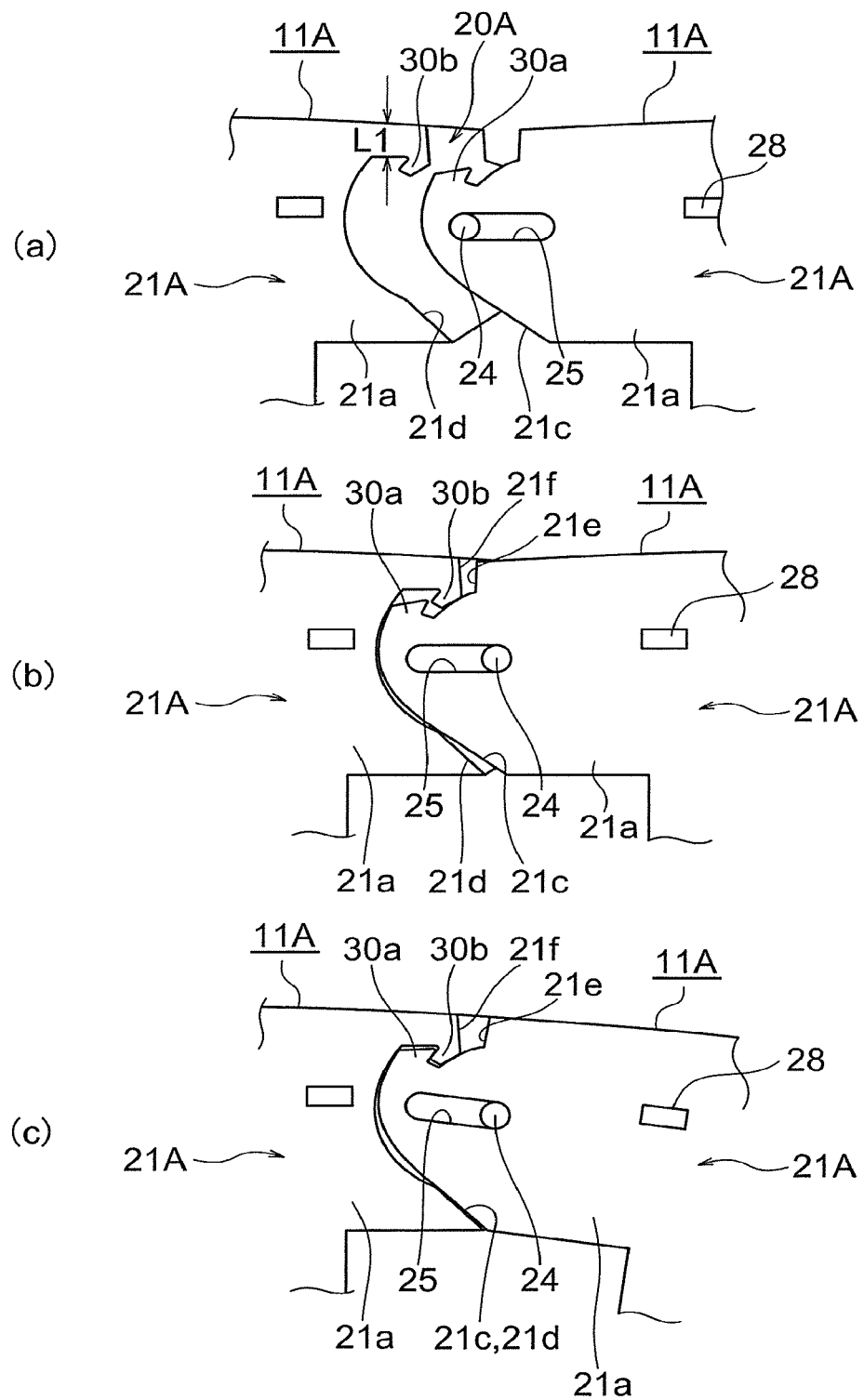
FIG. 14 shows partial enlargements that explain the expanding and contracting operations of the core segment linked body that constitutes part of the armature segment of the rotary electric machine according to Embodiment 2 of the present invention.

FIG. 8 is a plan that shows a rotary electric machine according to Embodiment 2 of the present invention, FIG. 9 is a plan that shows an armature segment that constitutes part of an armature of the rotary electric machine according to Embodiment 2 of the present invention, FIG. 10 is a plan that shows a core segment linked body that constitutes part of the armature segment of the rotary electric machine according to Embodiment 2 of the present invention, FIG. 11 shows diagrams that explain materials yield of core laminations that constitute part of the core segment linked body of the rotary electric machine according to Embodiment 2 of the present invention, FIG. 12 shows diagrams that explain a linked state between first core segments of the core segment linked body of the rotary electric machine according to Embodiment 2 of the present invention, FIG. 13 shows plans that explain expanding and contracting operations of the core segment linked body that constitutes part of the armature segment of the rotary electric machine according to Embodiment 2 of the present invention, and FIG. 14 shows partial enlargements that explain the expanding and contracting operations of the core segment linked body that constitutes part of the armature segment of the rotary electric machine according to Embodiment 2 of the present invention.

In FIG. 8, a rotary electric machine includes: a rotor 1 that is fixed to a rotating shaft 2 that is rotatably supported by a housing (not shown) so as to be disposed inside the housing; and an armature 5A that is held by the housing so as to surround the rotor 1 such that a constant air gap is interposed between the armature 5A and the rotor 1.

The armature 5A includes: an armature core GA in which thirty-six magnetic pole teeth 6b are respectively disposed so as to project radially inward from an inner circumferential wall surface of an annular back yoke 6a at a uniform pitch in a circumferential direction; and an armature coil 8 that is constituted by coils 8a that are produced by winding a conductor wire onto each of the magnetic pole teeth 6b so as to have insulators 7 interposed.

The armature 5A is configured into an annular shape by arranging six armature segments 9A in a circumferential direction, the armature segments 9A being configured into circular arc shapes that are shown in FIG. 9. The armature segments 9A are constituted by: core segment linked bodies 10A that are configured into circular arc shapes; and the coils 8a, which are prepared by winding conductor wires onto each of the magnetic pole teeth 6b so as to have the insulators 7 interposed. The core segment linked bodies 10A, as shown in FIG. 10, include: four first core segments 11A that are linked in a chain; a second core segment 12A that is linked to a left end of the four first core segments 11A; and a third core segment 13A that is linked to a right end of the four first core segments 11A.

The first core segments 11A are configured by laminating and integrating a laminated body of first core laminations 20A, second core laminations 21A, third core laminations 22A, and fourth core laminations 23A in a plurality of layers.

The second core segments 12A are configured by laminating and integrating a laminated body of first core laminations 20A', second core laminations 21A', third core laminations 22A', and fourth core laminations 23A' in a plurality of layers.

The third core segments 13A are configured by laminating and integrating a laminated body of first core laminations 20A", second core laminations 21A, third core laminations 22A, and fourth core laminations 23A" in a plurality of layers.

The first core laminations 20A are configured in a similar or identical manner to the first core laminations 20 in Embodiment 1 except that a first protruding portion 30a and a second protruding portion 30b are formed on two longitudinal end portions of a first back yoke portion 20a. The first core laminations 20A' are configured in a similar or identical manner to the first core laminations 20A except that a second longitudinal end portion of a first back yoke portion 20a thereof bulges outward convexly. The first core laminations 20A" are configured in a similar or identical manner to the first core laminations 20A except that a first longitudinal end portion of a first back yoke portion 20a thereof is hollowed out concavely.

The second core laminations 21A are configured in a similar or identical manner to the second core laminations 21 in Embodiment 1 except that a first protruding portion 30a and a second protruding portion 30b are formed on two longitudinal end portions of a second back yoke portion 21a. The second core laminations 21A' are configured in a similar or identical manner to the second core laminations 21A except that the first slot 25 and the first protruding portion 30a are omitted.

The third core laminations 22A are configured in a similar or identical manner to the third core laminations 22 in Embodiment 1 except that a first protruding portion 30a and a second protruding portion 30b are formed on two longitudinal end portions of a third back yoke portion 22a. The third core laminations 22A' are configured in a similar or identical manner to the third core laminations 22A except that the second shaft 26 and the first protruding portion 30a are omitted.

The fourth core laminations 23A are configured in a similar or identical manner to the fourth core laminations 23 in Embodiment 1 except that a first protruding portion 30a and a second protruding portion 30b are formed on two longitudinal end portions of a fourth back yoke portion 23a.

The fourth core laminations 23A' are configured in a similar or identical manner to the fourth core laminations 23A except that a second longitudinal end portion of a fourth back yoke portion 23a thereof bulges outward convexly. The fourth core laminations 23A" are configured in a similar or identical manner to the fourth core laminations 23A except that a first longitudinal end portion of a fourth back yoke portion 23a thereof is hollowed out concavely.

As shown in FIG. 11(a), the first core laminations 20A, 20A', and 20A" are punched out from a sheet of magnetic steel plate so as to form an arrangement known as a "staggered straight row pair" in which two core lamination groups that are lined up in single columns in a longitudinal direction of the first back yoke portions 20a such that the first magnetic pole tooth portions 20b are parallel are disposed in opposite directions such that the first magnetic pole tooth portions 20b of one core lamination group are placed between the first magnetic pole tooth portions 20b of the other core lamination group.

Similarly, as shown in FIG. 11(b), the second core laminations 21A and 21A' are punched out from a sheet of magnetic steel plate so as to form an arrangement known as a "staggered straight row pair" in which two core lamination groups that are lined up in single columns in a longitudinal direction of the second back yoke portions 21a such that the second magnetic pole tooth portions 21b are parallel are disposed in opposite directions such that the second magnetic pole tooth portions 21b of one core lamination group are placed between the second magnetic pole tooth portions 21b of the other core lamination group.

Similarly, as shown in FIG. 11(c), the third core laminations 22A and 22A' are punched out from a sheet of magnetic steel plate so as to form an arrangement known as a "staggered straight row pair" in which two core lamination groups that are lined up in single columns in a longitudinal direction of the third back yoke portions 22a such that the third magnetic pole tooth portions 22b are parallel are disposed in opposite directions such that the third magnetic pole tooth portions 22b of one core lamination group are placed between the third magnetic pole tooth portions 22b of the other core lamination group.

Similarly, as shown in FIG. 11(d), the fourth core laminations 23A, 23A', and 23A" are punched out from a sheet of magnetic steel plate so as to form an arrangement known as a "staggered straight row pair" in which two core lamination groups that are lined up in single columns in a longitudinal direction of the fourth back yoke portions 23a such that the fourth magnetic pole tooth portions 23b are parallel are disposed in opposite directions such that the fourth magnetic pole tooth portions 23b of one core lamination group are placed between the fourth magnetic pole tooth portions 23b of the other core lamination group.

Moreover, the first through fourth core laminations of each of the core lamination groups are arranged rectilinearly at a spacing that corresponds to when the core segment linked bodies 10A are positioned in an expanded position.

These core lamination groups are punched out in an identical die in this manner, are stacked in an identical die, and are fixed by crimping at the crimping portions 28 to produce a core lamination linked body. A required number of the core lamination linked bodies are then stacked, and are fixed by crimping at the crimping portions 28 to produce a core segment linked body 10A.

Here, the first through fourth core laminations 20A, 21A, 22A, and 23A are stacked sequentially in order of a third core lamination 22A, a fourth core lamination 23A, a first core lamination 20A, and a second core lamination 21A such that the first through fourth back yoke portions 20a, 21a, 22a, and 23a and the first through fourth magnetic pole tooth portions 20b, 21b, 22b, and 23b are stacked. This operation is performed repeatedly, and the first core segment 11A is formed by fixing the stacked plurality of first through fourth core laminations 20A through 23A by crimping at the crimping portions 28.

The first through fourth core laminations 20A', 21A', 22A', and 23A' are stacked sequentially in order of a third core lamination 22A', a fourth core lamination 23A', a first core lamination 20A', and a second core lamination 21A' such that the first through fourth back yoke portions 20a, 21a, 22a, and 23a and the first through fourth magnetic pole tooth portions 20b, 21b, 22b, and 23b are stacked. This operation is performed repeatedly, and the second core segment 12A is formed by fixing the stacked plurality of first through fourth core laminations 20A', 21A', 22A', and 23A' by crimping at the crimping portions 28.

The first through fourth core laminations 20A", 21A, 22A, and 23A" are stacked sequentially in order of a third core lamination 22A, a fourth core lamination 23A", a first core lamination 20A″, and a second core lamination 21A such that the first through fourth back yoke portions 20a, 21a, 22a, and 23a and the first through fourth magnetic pole tooth portions 20b, 21b, 22b, and 23b are stacked. This operation is performed repeatedly, and the third core segment 13A is formed by fixing the stacked plurality of first through fourth core laminations 20A″, 21A, 22A, and 23A″ by crimping at the crimping portions 28.

Moreover, in the first through third core segments 11, 12, and 13, the first through fourth back yoke portions 20a, 21a, 22a, and 23a are laminated and integrated to constitute back yokes 6a′, and the first through fourth magnetic pole tooth portions 20b, 21b, 22b, and 23b are laminated and integrated to constitute the magnetic pole teeth 6b. The magnetic pole teeth 6b protrude from longitudinally central portions of the back yokes 6a′.

As shown in FIG. 12(a), the first core segments 11A that are configured in this manner are linked together by the first shafts 24 being inserted inside the first slots 25, and by the second shafts 26 being inserted inside the second slots 27. Thus, when the aperture directions of the first and second slots 25 and 27 are in a parallel state, the first and second shafts 24 and 26 move so as to be guided by the first and second slots 25 and 27, and spacing between the magnetic pole teeth 6b of the two first core segments 11A expands and contracts.

As shown in FIGS. 13(a) and 14(a), when the first shafts 24 come into contact with the second end portions of the first slots 25, the spacing between the magnetic pole teeth 6b of the two first core segments 11A is maximized (an expanded position). In this expanded position, the second shafts 26 are placed in contact with the first end portions of the second slots 27, and the central axes of the first shafts 24 and the second shafts 26 are offset in the aperture direction (left-right in FIG. 12(b)) of the first and second slots 25 and 27. As shown in FIG. 14(a), the first protruding portion 30a and the second protruding portion 30b are spaced apart.

Thus, when the core segment 11A on the right in FIGS. 13(a) and 14(a) is moved to the left, and approaches the contracted position, the first protruding portion 30a contacts the second protruding portion 30b. Then, the first protruding portion 30a is press-fitted into the second protruding portion 30b. Here, the first protruding portion 30a elastically deforms an outer edge portion of the second protruding portion 30b of the first back yoke portion 20a while being pushed inside the second protruding portion 30b (a press-fitted state). When the first protruding portion 30a is fitted completely inside the second protruding portion 30b, the first protruding portion 30a is released from the press-fitted state. The outer edge portion of the second protruding portion 30b then recovers, preventing disengagement of the first protruding portion 30a. Here, the insertion pressure between the first protruding portion 30a and the second protruding portion 30b can be set by adjusting the dimension L1 of the outer edge portion of the second protruding portion 30b.

As shown in FIGS. 13(b) and 14(b), when the first shafts 24 come into contact with the first end portions of the first slots 25, the spacing between the magnetic pole teeth 6b of the two first core segments 11A is minimized (a contracted position). In this contracted position, the first protruding portion 30a is fitted completely inside the second protruding portion 30b. As shown in FIG. 12(c), the second shafts 26 come into contact with second end portions of the second slots 27, and the central axes of the first shafts 24 and the second shafts 26 are positioned collinearly in a direction of lamination of the core laminations. In other words, the central axes of the first shafts 24 and the second shafts 26 are coaxial. When the first slots 25 are projected in the axial direction of the first shafts 24 and the second shafts 26 onto a common plane with the second slots 27 in the contracted position, the first slots 25 and the second slots 27 on the projected plane have a point-symmetrical aperture shape that has the point of intersection between the central axes of the first shafts 24 and the second shafts 26 and the projected plane as a center of symmetry.

Thus, pivoting operation of the two first core segments 11A around the first shafts 24 and the second shafts 26 is enabled in the contracted position. When pivoted around the first and second shafts 24 and 26 in the direction that narrows the interval between the magnetic pole teeth 6b, an end portion 21c of the convex bulging portion on a side of the second back yoke portion 21a of the second core lamination 21 near a magnetic pole tooth portion comes into contact with an end portion 21d of the concave hollowed portion on a side of the second back yoke portion 21a of the neighboring second core lamination 21 near the magnetic pole tooth portion such that further pivoting is restricted, as shown in FIGS. 13(c) and 14(c). When pivoted around the first and second shafts 24 and 26 in the direction that widens the interval between the magnetic pole teeth 6b, an end portion 21e of the convex bulging portion on an opposite side of the second back yoke portion 21a of the second core lamination 21 from a magnetic pole tooth portion comes into contact with an end portion 21f of the concave hollowed portion on an opposite side of the second back yoke portion 21a of the neighboring second core lamination 21 from the magnetic pole tooth portion such that further pivoting is restricted, as shown in FIG. 12(d). In addition, in the expanded position, and between the expanded position and the contracted position, the two first core segments 11A are limited to only movement in the aperture directions of the first and second slots 25 and 27.

Moreover, in FIGS. 12(b) through 12(d), four first through fourth core laminations 20A through 23A are used to represent the linked state between the first core segments 11A to facilitate explanation.

The second core segment 12A and a first core segment 11A, and a first core segment 11A and the third core segment 13A, are also linked by the first shafts 24 being inserted inside the first slots 25, and by the second shafts 26 being inserted inside the second slots 27. Consequently, the second core segment 12A and a first core segment 11A, and a first core segment 11A and the third core segment 13A, operate in a similar manner to the way that the first core segments 11A operate with each other.

The armature segments 9A are produced by mounting coils 8a to the magnetic pole teeth 6b of the core segment linked bodies 10A that have been configured in this manner so as to have the insulators 7 interposed. Next, the six core segment linked bodies 10A are pivoted around the first shafts 24 and the second shafts 26 to form circular arc shapes, and are arranged circumferentially. At this point, the six core segment linked bodies 10A are linked into an annular shape by fitting the convex bulging portions of the back yokes 6a′ of the second core segments 12A into the concave hollowed portions of the back yokes 6a′ of the third core segments 13A. Next, the six core segment linked bodies 10A that are linked into the annular shape are inserted into and fixed to a cylindrical frame by shrinkage fitting to produce the armature 5A.

Consequently, similar or identical effects to those of Embodiment 1 can also be achieved in Embodiment 2.

In Embodiment 2, a first protruding portion 30a and a second protruding portion 30b that are formed on two longitudinal end portions of first back yoke portions 20a are configured so as to enter a press-fitted state in a process of contracting from an expanded position to a contracted position, and then to enter the contracted position after being released from the press-fitted state.

In this manner, displacing operations of the first through third core segments 11A, 12A, and 13A in the aperture directions of the first and second slots 25 and 27 can no longer be performed easily in the contracted position. Specifically, a motive force that is greater than or equal to the force that releases the press-fitted state between the first protruding portion 30a and the second protruding portion 30b is required in order to displace from the contracted position to the expanded position. Thus, when the core segment linked body 10A is pivoted around the first and second shafts 24 and 26 in order to widen or narrow the interval between the magnetic pole teeth 6b after it is contracted rectilinearly, the core segment linked body 10A can be prevented from returning to the expanded position unintentionally. In other words, the pivoting operation of the core segment linked body 10A can be performed more easily and reliably. Mounting of the coils 8a is thereby facilitated.

Because the first protruding portion 30a is press-fitted into the second protruding portion 30b by elastically deforming an outer edge portion of the second protruding portion 30b, deformation of the aperture shapes of the first and second slots 25 and 27 is less likely to occur. Thus, the pivoting operation around the first and second shafts 24 and 26 and the displacing operation between the expanded position and the contracted position are smooth.

From the above, according to Embodiment 2, productivity of the armature 5A can be improved.

Figure 15:
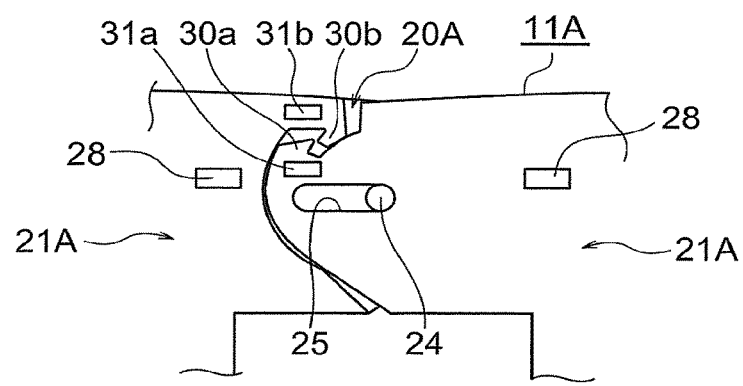
FIG. 15 is a partial enlargement that shows a variation of the core segment linked body that constitutes part of the armature segment of the rotary electric machine according to Embodiment 2 of the present invention.

Moreover, in Embodiment 2 above, the outer edge portion of the second protruding portion 30b is configured so as to enable elastic deformation during the operation of press-fitting the first protruding portion 30a by adjusting the dimension L1 of the outer edge portion of the second protruding portion 30b, but as shown in FIG. 15, penetrating apertures 31a and 31b may be formed in a vicinity of the first and second protruding portions 30a and 30b, and the aperture shapes of the penetrating apertures 31a and 31b deformed during press-fitting between the first protruding portion 30a and the second protruding portion 30b.

In Embodiment 2 above, first and second protruding portions are formed on two longitudinal end portions of the back yoke portions of first through fourth core laminations, but first and second protruding portions need only be formed on at least one core lamination among the first through fourth core laminations.

In Embodiment 2 above, first and second protruding portions are formed on all of the first through fourth core laminations that constitute linking portions between core segments, but first and second protruding portions need only be formed on some of the first through fourth core laminations that constitute linking portions between the core segments.

Embodiment 3

Figure 16:
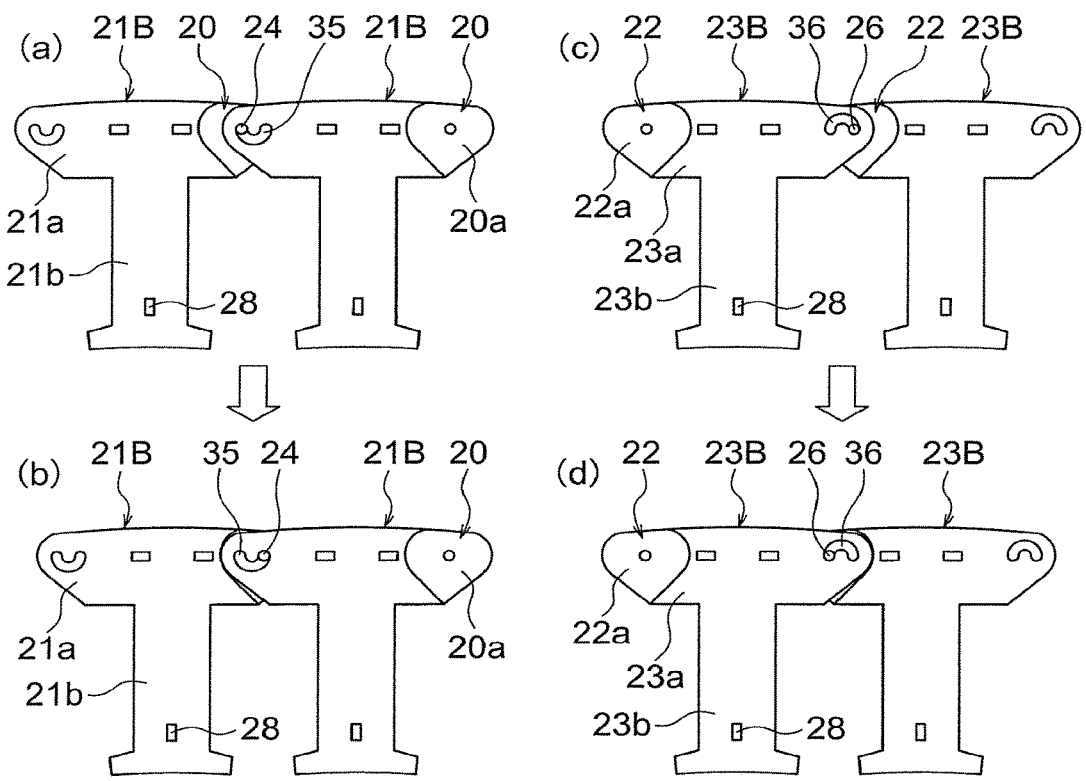
FIG. 16 shows plans that explain expanding and contracting operations of a core segment linked body that constitutes part of an armature segment of a rotary electric machine according to Embodiment 3 of the present invention.
Figure 17:
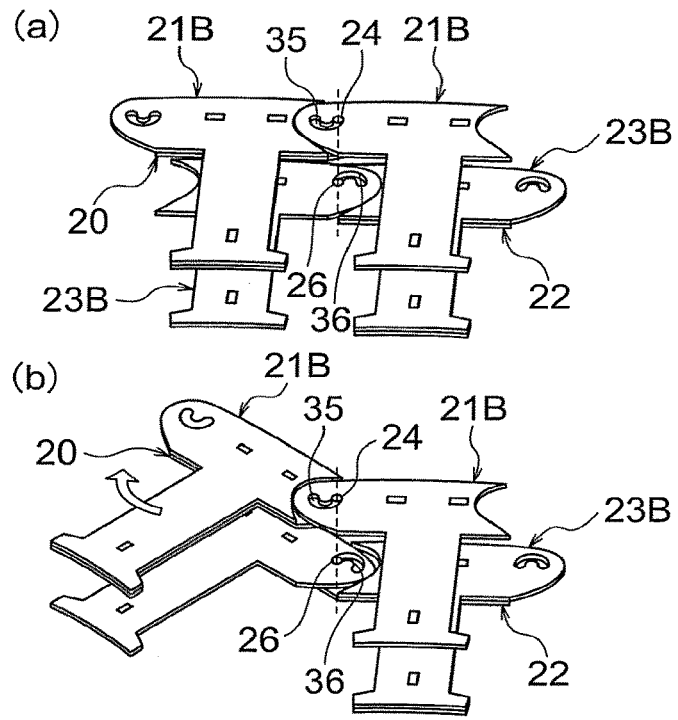
FIG. 17 shows oblique projections that explain a pivoting operation in a contracted position of the core segment linked body that constitutes part of the armature segment of the rotary electric machine according to Embodiment 3 of the present invention.

FIG. 16 shows plans that explain expanding and contracting operations of a core segment linked body that constitutes part of an armature segment of a rotary electric machine according to Embodiment 3 of the present invention, and FIG. 17 shows oblique projections that explain a pivoting operation in a contracted position of the core segment linked body that constitutes part of the armature segment of the rotary electric machine according to Embodiment 3 of the present invention.

In FIG. 16, first slots 35 are formed on second longitudinal end portions of second back yoke portions 21a of second core laminations 21B so as to have circular arc-shaped aperture shapes. Second slots 36 are formed on first longitudinal end portions of fourth back yoke portions 23a of fourth core laminations 23B so as to have circular arc-shaped aperture shapes.

Moreover, Embodiment 3 is configured in a similar or identical manner to Embodiment 1 above except that the second and fourth core laminations 21B and 23B, on which the first and second slots 35 and 36 that have circular arc-shaped aperture shapes are formed, are used instead of the second and fourth core laminations 21 and 23.

In Embodiment 3, the first through fourth core laminations 20, 21B, 22, and 23B are stacked sequentially in order of a third core lamination 22, a fourth core lamination 23B, a first core lamination 20, and a second core lamination 21B such that the first through fourth back yoke portions 20a, 21a, 22a, and 23a and the first through fourth magnetic pole tooth portions 20b, 21b, 22b, and 23b are stacked. This operation is performed repeatedly, and a first core segment is produced by fixing the stacked plurality of first through fourth core laminations 20, 21B, 22, and 23B by crimping at the crimping portions 28. Moreover, second and third core segments are produced in a similar manner.

The first core segments are linked by inserting the first shafts 24 into the first slots 35, and inserting the second shafts 26 in the second slots 36. As shown in FIGS. 16(a) and 16(c), the linked first core segments expand rectilinearly and enter the expanded position by the first shafts 24 being placed in contact with the second end portions of the first slots 35, and the second shafts 26 being placed in contact with the first end portions of the second slots 36. The central axes of the first shafts 24 and the second shafts 26 are offset in the longitudinal direction of the back yoke portions in this expanded position.

As shown in FIGS. 16(b) and 16(d), the linked first core segments contract and enter the contracted position by the first shafts 24 being placed in contact with the first end portions of the first slots 35, and the second shafts 26 being placed in contact with the second end portions of the second slots 36. In this contracted position, as shown in FIG. 17(a), the central axes of the first shafts 24 and the second shafts 26 are positioned collinearly in a direction of lamination of the core laminations. In other words, the central axes of the first shafts 24 and the second shafts 26 are coaxial. Thus, the linked first core segments are pivotable around the central axes of the first and second shafts 24 and 26, as shown in FIG. 17(b).

When the first slots 35 are projected in the axial direction of the first shafts 24 and the second shafts 26 onto a common plane with the second slots 36 in the contracted position, the first slots 35 and the second slots 36 on the projected plane have a point-symmetrical aperture shape that has the point of intersection between the central axes of the first shafts 24 and the second shafts 26 and the projected plane as a center of symmetry. Thus, the expanding operation, the contracting operation, and the pivoting operation of the linked first core segments are performed smoothly. Moreover, the first through third core segments are linked in a similar manner to produce core segment linked bodies.

Consequently, similar or identical effects to those of Embodiment 1 can also be achieved in Embodiment 3.

Embodiment 4

Figure 18:
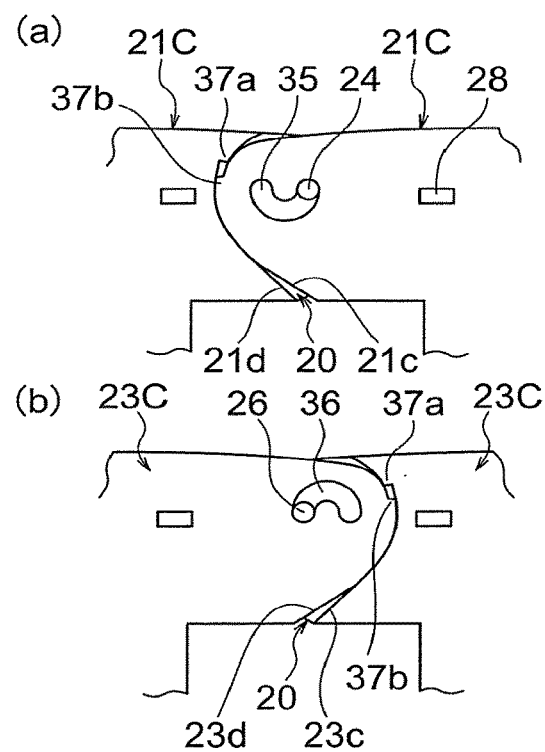
FIG. 18 shows partial enlargements that show a core segment linked body that constitutes part of an armature segment of a rotary electric machine according to Embodiment 4 of the present invention.

FIG. 18 shows partial enlargements that show a core segment linked body that constitutes part of an armature segment of a rotary electric machine according to Embodiment 4 of the present invention.

In FIG. 18, a first protruding portion 37a and a second protruding portion 37b are formed on two end portions in respective longitudinal directions of second and fourth back yoke portions 21a and 23a.

Moreover, Embodiment 4 is configured in a similar or identical manner to Embodiment 3 above except that the second and fourth core laminations 21C and 23C, in which the first protruding portion 37a and the second protruding portion 37b are formed on two end portions in longitudinal directions of the second and fourth back yoke portions 21a and 23a, are used instead of the second and fourth core laminations 21B and 23B.

In Embodiment 4, the first slots 35 are formed so as to have circular arc-shaped aperture shapes. Thus, the second and fourth core laminations 21C and 23C displace in the direction of protrusion of the magnetic pole tooth portions 21b relative to neighboring second and fourth core laminations 21C and 23C while approaching the neighboring second and fourth core laminations 21C and 23C in the process of moving from the expanded position to the contracted position. The amount of displacement in the direction of protrusion of the magnetic pole tooth portions 21b relative to the neighboring second and fourth core laminations 21C and 23C increases gradually from the expanded position toward an intermediate position, is at a maximum at the intermediate position, and gradually decreases toward the contracted position. Then, close to the contracted position, the first protruding portion 37a contacts the second protruding portion 37b of the neighboring second core lamination 21C. As the contracted position is approached further, the first protruding portion 37a is press-fitted into the second protruding portion 37b (a press-fitted state). Then, when the first protruding portion 37a passes over the second protruding portion 37b, the first protruding portion 37a is released from the press-fitted state, and enters the contracted position.

Then the first shaft 24 comes into contact with the first end of the first slot 35, as shown in FIG. 18(a). The second shaft 26 also comes into contact with the second end of the second slot 36, as shown in FIG. 18(b). Thus, the central axes of the first shafts 24 and the second shafts 26 are positioned collinearly in the direction of lamination of the core laminations, and the first through third core segments are pivotable. Then, the end portions 21c and 21d (or 37a and 37b) of the adjacent second core laminations 21C contact each other, and the end portions 23c and 23d of the adjacent fourth core laminations 23C contact each other, preventing further pivoting, and the core segment linked body is bent into a circular arc shape.

Consequently, similar or identical effects to those of Embodiment 3 can also be achieved in Embodiment 4.

In Embodiment 4, a first protruding portion 37a of a core lamination 21C and a second protruding portion 37b of a core lamination 21C are configured so as to enter a press-fitted state in a process of contracting from an expanded position to a contracted position, and then to enter the contracted position after being released from the press-fitted state.

Thus, displacing operations of the first through third core segments in the aperture directions of the first and second slots 35 and 36 can no longer be performed easily in the contracted position. Specifically, a motive force that is greater than or equal to the force that releases the press-fitted state between the first protruding portion 37a of the core lamination 21C and the second protruding portion 37b of the core lamination 21C is required in order to displace from the contracted position to the expanded position. Thus, when the core segment linked body 10A is pivoted around the first and second shafts 24 and 26 in order to widen or narrow the interval between the magnetic pole teeth 6b after it is contracted rectilinearly, the core segment linked body 10A can be prevented from returning to the expanded position unintentionally. In other words, the pivoting operation of the core segment linked body 10A can be performed more easily and reliably. Mounting of the coils 8a is thereby facilitated.

Consequently, according to Embodiment 4, productivity of the armature can be improved.

Embodiment 5

Figure 19:
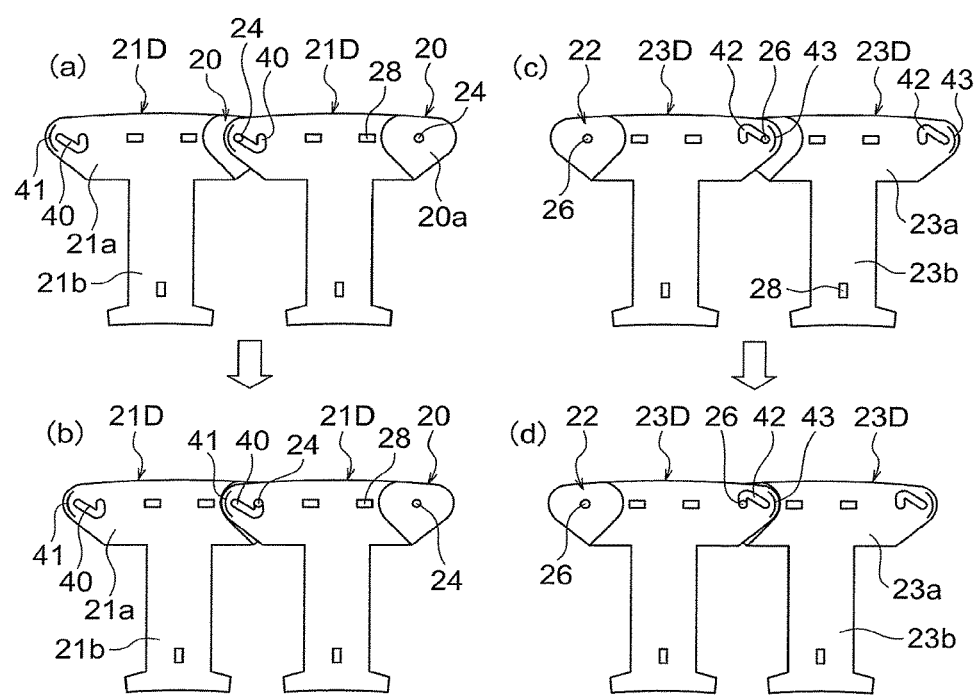
FIG. 19 shows plans that explain expanding and contracting operations of a core segment linked body that constitutes part of an armature segment of a rotary electric machine according to Embodiment 5 of the present invention.
Figure 20:
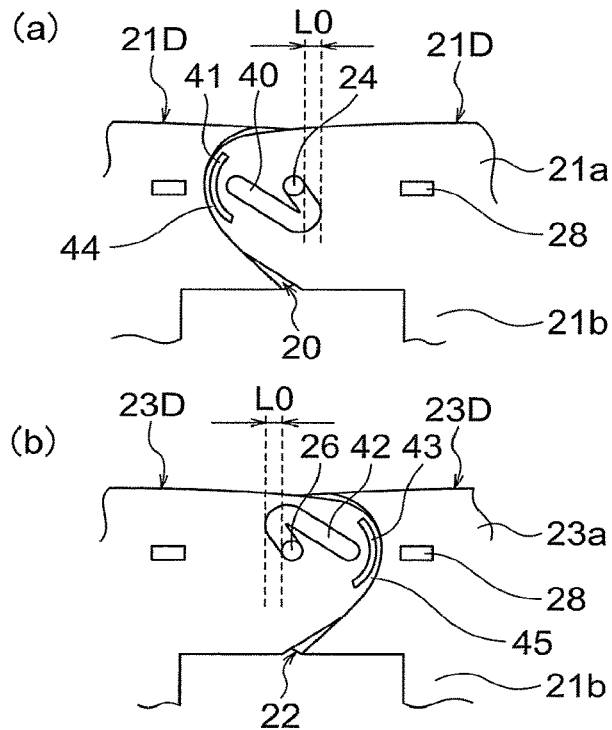
FIG. 20 shows partial enlargements that show a core segment linked body that constitutes part of the armature segment of the rotary electric machine according to Embodiment 5 of the present invention.
Figure 21:
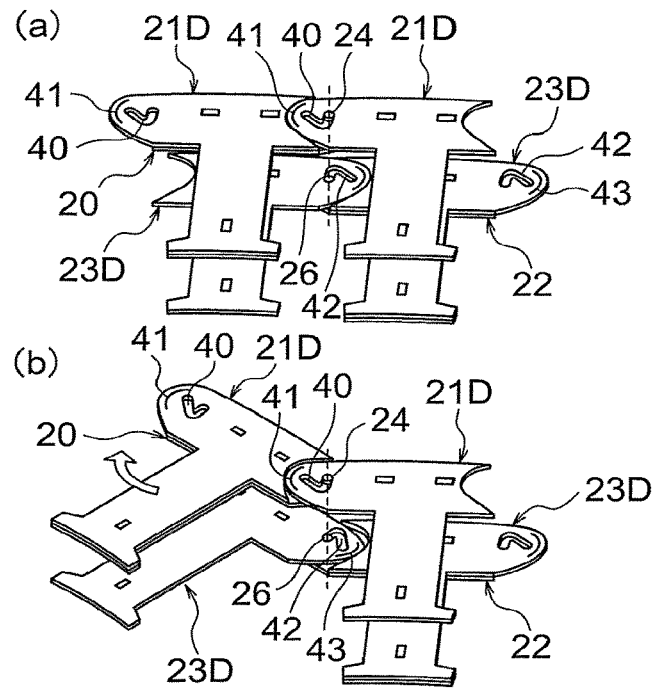
FIG. 21 shows oblique projections that explain a pivoting operation in a contracted position of the core segment linked body that constitutes part of the armature segment of the rotary electric machine according to Embodiment 5 of the present invention.

FIG. 19 shows plans that explain expanding and contracting operations of a core segment linked body that constitutes part of an armature segment of a rotary electric machine according to Embodiment 5 of the present invention, FIG. 20 shows partial enlargements that show a core segment linked body that constitutes part of the armature segment of the rotary electric machine according to Embodiment 5 of the present invention, and FIG. 21 shows oblique projections that explain a pivoting operation in a contracted position of the core segment linked body that constitutes part of the armature segment of the rotary electric machine according to Embodiment 5 of the present invention.

In FIGS. 19 and 20, first slots 40 are formed on second longitudinal end portions of second back yoke portions 21a of second core laminations 21D so as to have approximately V-shaped aperture shapes. In addition, first apertures 41 are formed on the second back yoke portions 21a of the second core laminations 21D on a second end side of the first slots 40 so as to have circular arc-shaped aperture shapes. Circular arc-shaped thin first elastically deforming portions 44 are formed on the second end side of the first apertures 41 thereby.

Second slots 42 are formed on first longitudinal end portions of fourth back yoke portions 23a of fourth core laminations 23D so as to have approximately V-shaped aperture shapes. In addition, second apertures 43 are formed on the fourth back yoke portions 23a of the fourth core laminations 23D on a first end side of the second slots 42 so as to have circular arc-shaped aperture shapes. Circular arc-shaped thin second elastically deforming portions 45 are formed on the first end side of the second apertures 43 thereby.

Moreover, Embodiment 5 is configured in a similar or identical manner to Embodiment 1 above except that the second and fourth core laminations 21D and 23D, on which the first and second slots 40 and 42 and the first and second elastically deforming portions 44 and 45 are formed, are used instead of the second and fourth core laminations 21 and 23.

In Embodiment 5, the first through fourth core laminations 20, 21D, 22, and 23D are stacked sequentially in order of a third core lamination 22, a fourth core lamination 23D, a first core lamination 20, and a second core lamination 21D such that the first through fourth back yoke portions 20a, 21a, 22a, and 23a and the first through fourth magnetic pole tooth portions 20b, 21b, 22b, and 23b are stacked. This operation is performed repeatedly, and a first core segment is produced by fixing the stacked plurality of first through fourth core laminations 20, 21D, 22, and 23D by crimping at the crimping portions 28. Moreover, second and third core segments are produced in a similar manner.

The first core segments are linked by inserting the first shafts 24 into the first slots 40, and inserting the second shafts 26 in the second slots 42. As shown in FIGS. 19(*a*) and 19(*c*), the linked first core segments expand rectilinearly and enter the expanded position by the first shafts 24 being placed in contact with the second end portions of the first slots 40, and the second shafts 26 being placed in contact with the first end portions of the second slots 42. The central axes of the first shafts 24 and the second shafts 26 are offset in the longitudinal direction of the back yoke portions in this expanded position.

As shown in FIGS. 19(*b*) and 19(*d*), the linked first core segments contract and enter the contracted position by the first shafts 24 being placed in contact with the first end portions of the first slots 40, and the second shafts 26 being placed in contact with the second end portions of the second slots 42. In this contracted position, as shown in FIG. 21(*a*), the central axes of the first shafts 24 and the second shafts 26 are positioned collinearly in a direction of lamination of the core laminations. In other words, the central axes of the first shafts 24 and the second shafts 26 are coaxial. Thus, the linked first core segments are pivotable around the central axis of the first and second shafts 24 and 26, as shown in FIG. 21(*b*).

When the first slots 40 are projected in the axial direction of the first shafts 24 and the second shafts 26 onto a common plane with the second slots 42 in the contracted position, the first slots 40 and the second slots 42 on the projected plane have a point-symmetrical aperture shape that has the point of intersection between the central axes of the first shafts 24 and the second shafts 26 and the projected plane as a center of symmetry. Thus, the expanding operation, the contracting operation, and the pivoting operation of the linked core segments are performed smoothly. Moreover, the first through third core segments are linked in a similar manner to produce core segment linked bodies.

Consequently, similar or identical effects to those of Embodiment 1 can also be achieved in Embodiment 5.

As shown in FIG. 20(*a*), the first slots 40 have aperture shapes such that when placed in contact with the first end portions of the approximately V-shaped aperture shapes the first shafts 24 are positioned closer to the second end by a first amount of movement (L0) than when the first shafts 24 are positioned at apex portions of the approximately V-shaped aperture shapes.

Similarly, as shown in FIG. 20(*b*), the second slots 42 have aperture shapes such that when placed in contact with the second end portions of the approximately V-shaped aperture shapes the second shafts 26 are positioned closer to the first end by the first amount of movement (L0) than when the second shafts 26 are positioned at apex portions of the approximately V-shaped aperture shapes.

Specifically, the first slots 40 are formed so as to have approximately V-shaped aperture shapes that guide the first shafts 24 so as to move from the expanded position beyond the contracted position by a first amount of movement (L0) in the longitudinal direction of the second back yoke portions 21*a*, and then to return by the first amount of movement (L0) toward the expanded position to reach the contracted position. Similarly, the second slots 42 are formed so as to have approximately V-shaped aperture shapes that guide the second shafts 26 so as to move from the expanded position beyond the contracted position by a first amount of movement (L0) in the longitudinal direction of the fourth back yoke portions 23*a*, and then to return by the first amount of movement (L0) toward the expanded position to reach the contracted position.

Thus, in the process of moving from the expanded position to the contracted position, the side and end portions of the second and fourth back yoke portions 21*a* and 23*a* of the second and fourth core laminations 21D and 23D contact the side and end portions of the second and fourth back yoke portions 21*a* and 23*a* of the neighboring second and fourth core laminations 21D and 23D immediately before the first and second shafts 24 and 26 reach the apex portions of the first and second slots 40 and 42. When moved further toward the contracted position, the thin first and second elastically deforming portions 44 and 45 that are formed outside the first and second apertures 41 and 43 deform elastically, and enter a press-fitted state. The amount of elastic deformation of the first and second elastically deforming portions 44 and 45 is at a maximum when the first and second shafts 24 and 26 reach the apex portions of the first and second slots 40 and 42. Then, when the first shafts 24 are past the apex portions of the first slots 40, the first shafts 24 move toward the first end portions of the first slots 40 due to the force of recovery of the first elastically deforming portions 44, are released from the press-fitted state, and contact the first end portions of the first slots 40 to enter the contracted position. When the second shafts 26 are past the apex portions of the second slots 42, the second shafts 26 also move toward the second end portions of the second slots 42 due to the force of recovery of the second elastically deforming portions 45, are released from the press-fitted state, and contact the second end portions of the second slots 42 to enter the contracted position. Although not shown, gaps are formed between the side and end portions of the first back yoke portion 20*a* of adjacent first core laminations 20 and between the side and end portions of the first back yoke portion 22*a* of adjacent third core laminations 22 by the first shafts 24 moving toward the first end portions of the first slots 40, and the second shafts 26 moving toward the second end portions of the second slots 42.

In this manner, adjacent second core laminations 21D, and adjacent fourth core laminations 23D, are configured so as to enter a press-fitted state in a process of contracting from an expanded position to a contracted position, and then to enter the contracted position after being released from the press-fitted state.

Thus, displacing operations of the first through third core segments in the longitudinal directions of the back yoke portions can no longer be performed easily in the contracted position. Specifically, a motive force that is greater than or equal to the force that releases the press-fitted state is required in order to displace from the contracted position to the expanded position. Thus, when the core segment linked body is pivoted around the first and second shafts 24 and 26 so as to widen the interval between the magnetic pole teeth after it is contracted rectilinearly, the core segment linked body 10A can be held stably in a state in which the interval between the magnetic pole teeth is widened. Mounting of the coils is thereby facilitated.

Consequently, according to Embodiment 5, productivity of the armature can be improved.

Moreover, in Embodiment 5 above, the linking constructions between the core segments that constitute the core segment linked bodies have identical constructions, but it is not necessary for all of the linking constructions between the core segments that constitute the core segment linked bodies to have identical constructions, and the core segments that constitute the core segment linked bodies may be linked to each other by the linking construction according to Embodiment 2 above and the linking construction according to Embodiment 5 above, or may be linked by the linking construction according to Embodiment 2 above, the linking construction according to Embodiment 3 above, and the linking construction according to Embodiment 5 above, for example.

Embodiment 6

Figure 22:
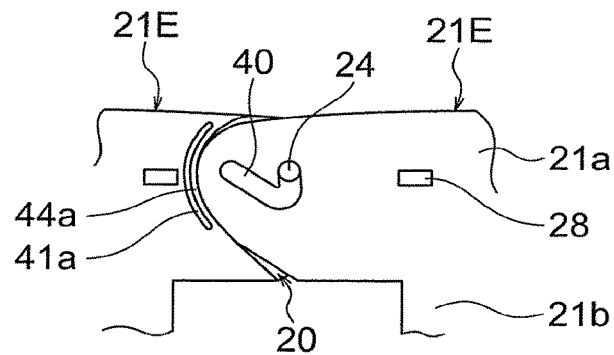
FIG. 22 is a partial enlargement that shows a core segment linked body that constitutes part of an armature segment of a rotary electric machine according to Embodiment 6 of the present invention.

FIG. 22 is a partial enlargement that shows a core segment linked body that constitutes part of an armature segment of a rotary electric machine according to Embodiment 6 of the present invention.

In FIG. 22, first slots 40 are formed on second longitudinal end portions of second back yoke portions 21a of second core laminations 21E so as to have approximately V-shaped aperture shapes. In addition, first apertures 41a are formed near a first end in a longitudinal direction of the second back yoke portions 21a of the second core laminations 21E so as to have circular arc-shaped aperture shapes. Circular arc-shaped thin first elastically deforming portions 44a are formed on the first end side of the first apertures 41a thereby. Second slots are formed on first longitudinal end portions of fourth back yoke portions of fourth core laminations so as to have approximately V-shaped aperture shapes, and second apertures are formed near a second end in a longitudinal direction of the fourth back yoke portions of the fourth core laminations so as to have circular arc-shaped aperture shapes, forming circular arc-shaped thin second elastically deforming portions 45 on the first end side of the second apertures, but explanation thereof will be omitted here.

Moreover, Embodiment 6 is configured in a similar manner to Embodiment 5 above except that the first and second apertures are formed on end portions at opposite ends of the back yoke portions of the second and fourth core laminations from the first and second slots.

In Embodiment 6, in the process of moving from the expanded position to the contracted position, the side and end portions of the second back yoke portions 21a of the second core laminations 21E contact the side and end portions of the second back yoke portions 21a of the neighboring second core laminations 21E immediately before the first shafts 24 reach the apex portions of the first slots 40. When moved further toward the contracted position, the thin first elastically deforming portions 44a that are formed outside the first apertures 41a deform elastically, and enter a press-fitted state. The amount of elastic deformation of the first elastically deforming portions 44a is at a maximum when the first shafts 24 reach the apex portions of the first slots 40. Then, when the first shafts 24 are past the apex portions of the first slots 40, the first shafts 24 move toward the first end portions of the first slots 40 due to the force of recovery of the first elastically deforming portions 44a, are released from the press-fitted state, and contact the first end portions of the first slots 40 to enter the contracted position. Although not shown, gaps are formed between the side and end portions of the first back yoke portion 20a of adjacent first core laminations 20 by the first shafts 24 moving toward the first end portions of the first slots 40.

In this manner, adjacent second core laminations 21E are configured so as to enter a press-fitted state in a process of contracting from an expanded position to a contracted position, and then to enter the contracted position after being released from the press-fitted state. Moreover, the adjacent fourth core laminations also operate in a similar manner.

Consequently, in Embodiment 6, displacing operations of the first through third core segments in the longitudinal directions of the back yoke portions can also no longer be performed easily in the contracted position. Specifically, a motive force that is greater than or equal to the force that releases the press-fitted state is required in order to displace from the contracted position to the expanded position. Thus, when the core segment linked body is pivoted around the first shafts 24 and the second shafts so as to widen the interval between the magnetic pole teeth after it is contracted rectilinearly, the core segment linked body 10A can be held stably in a state in which the interval between the magnetic pole teeth is widened. Mounting of the coils is thereby facilitated.

Embodiment 7

Figure 23:
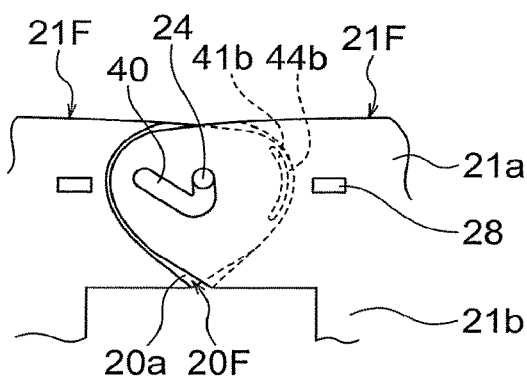
FIG. 23 is a partial enlargement that shows a core segment linked body that constitutes part of an armature segment of a rotary electric machine according to Embodiment 7 of the present invention.

FIG. 23 is a partial enlargement that shows a core segment linked body that constitutes part of an armature segment of a rotary electric machine according to Embodiment 7 of the present invention.

In FIG. 23, first slots 40 are formed on second longitudinal end portions of second back yoke portions 21a of second core laminations 21F so as to have approximately V-shaped aperture shapes. In addition, first apertures 41b are formed on a first end side in a longitudinal direction of first back yoke portions 20a of first core laminations 20F so as to have circular arc-shaped aperture shapes. Circular arc-shaped thin first elastically deforming portions 44b are formed on the first end side of the first apertures 41b thereby. Second slots are formed on first longitudinal end portions of fourth back yoke portions of fourth core laminations so as to have approximately V-shaped aperture shapes, and second apertures are formed near a second end in a longitudinal direction of third back yoke portions of third core laminations so as to have circular arc-shaped aperture shapes, forming circular arc-shaped thin second elastically deforming portions 45 on the first end side of the second apertures, but explanation thereof will be omitted here.

Moreover, Embodiment 7 is configured in a similar manner to Embodiment 5 above except that the first and second apertures are formed on end portions of the back yoke portions of the first and third core laminations near the first and second shafts.

In Embodiment 7, in the process of moving from the expanded position to the contracted position, the side and end portions of the first back yoke portions 20a of the first core laminations 20F contact the side and end portions of the first back yoke portions 20a of the neighboring first core laminations 20F immediately before the first shafts 24 reach the apex portions of the first slots 40. When moved further toward the contracted position, the thin first elastically deforming portions 44b that are formed outside the first apertures 41b deform elastically, and enter a press-fitted state. The amount of elastic deformation of the first elastically deforming portions 44b is at a maximum when the first shafts 24 reach the apex portions of the first slots 40. Then, when the first shafts 24 are past the apex portions of the first slots 40, the first shafts 24 move toward the first end portions of the first slots 40 due to the force of recovery of the first elastically deforming portions 44b, are released from the press-fitted state, and contact the first end portions of the first slots 40 to enter the contracted position. Gaps are formed between the side and end portions of the second back yoke portion 21a of adjacent second core laminations 21F by the first shafts 24 moving toward the first end portions of the first slots 40.

In this manner, adjacent first core laminations 20F are configured so as to enter a press-fitted state in a process of contracting from an expanded position to a contracted position, and then to enter the contracted position after being released from the press-fitted state. Moreover, the adjacent third core laminations also operate in a similar manner.

Consequently, in Embodiment 7, displacing operations of the first through third core segments in the longitudinal directions of the back yoke portions can also no longer be performed easily in the contracted position. Specifically, a motive force that is greater than or equal to the force that releases the press-fitted state is required in order to displace from the contracted position to the expanded position. Thus, when the core segment linked body is pivoted around the first shafts 24 and the second shaft so as to widen the interval between the magnetic pole teeth after it is contracted rectilinearly, the core segment linked body 10A can be held stably in a state in which the interval between the magnetic pole teeth is widened. Mounting of the coils is thereby facilitated.

Embodiment 8

Figure 24:
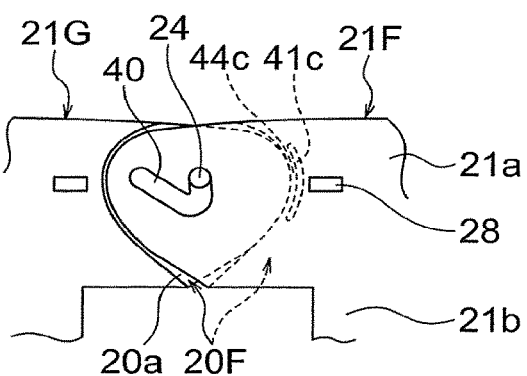
FIG. 24 is a partial enlargement that shows a core segment linked body that constitutes part of an armature segment of a rotary electric machine according to Embodiment 8 of the present invention.

FIG. 24 is a partial enlargement that shows a core segment linked body that constitutes part of an armature segment of a rotary electric machine according to Embodiment 8 of the present invention.

In FIG. 24, first slots 40 are formed on second longitudinal end portions of second back yoke portions 21a of second core laminations 21G so as to have approximately V-shaped aperture shapes. In addition, first apertures 41c are formed near a second end in a longitudinal direction of first back yoke portions 20a of first core laminations 20G so as to have circular arc-shaped aperture shapes. Circular arc-shaped thin first elastically deforming portions 44b are formed on the second end side of the first apertures 41c thereby. Second slots are formed on first longitudinal end portions of fourth back yoke portions of fourth core laminations so as to have approximately V-shaped aperture shapes, and second apertures are formed near a first end in a longitudinal direction of third back yoke portions of third core laminations so as to have circular arc-shaped aperture shapes, forming circular arc-shaped thin second elastically deforming portions 45 on the first end side of the second apertures, but explanation thereof will be omitted here.

Moreover, Embodiment 8 is configured in a similar manner to Embodiment 5 above except that the first and second apertures are formed on end portions of the back yoke portions of the first and third core laminations on an opposite side from the first and second shafts.

In Embodiment 8, in the process of moving from the expanded position to the contracted position, the side and end portions of the first back yoke portions 20a of the first core laminations 20G contact the side and end portions of the first back yoke portions 20a of the neighboring first core laminations 20G immediately before the first shafts 24 reach the apex portions of the first slots 40. When moved further toward the contracted position, the thin first elastically deforming portions 44c that are formed outside the first apertures 41c deform elastically, and enter a press-fitted state. The amount of elastic deformation of the first elastically deforming portions 44c is at a maximum when the first shafts 24 reach the apex portions of the first slots 40. Then, when the first shafts 24 are past the apex portions of the first slots 40, the first shafts 24 move toward the first end portions of the first slots 40 due to the force of recovery of the first elastically deforming portions 44c, are released from the press-fitted state, and contact the first end portions of the first slots 40 to enter the contracted position. Gaps are formed between the side and end portions of the second back yoke portion 21a of adjacent second core laminations 21G by the first shafts 24 moving toward the first end portions of the first slots 40.

In this manner, adjacent first core laminations 20G are configured so as to enter a press-fitted state in a process of contracting from an expanded position to a contracted position, and then to enter the contracted position after being released from the press-fitted state. Moreover, the adjacent third core laminations also operate in a similar manner.

Consequently, in Embodiment 8, displacing operations of the first through third core segments in the longitudinal directions of the back yoke portions can also no longer be performed easily in the contracted position. Specifically, a motive force that is greater than or equal to the force that releases the press-fitted state is required in order to displace from the contracted position to the expanded position. Thus, when the core segment linked body is pivoted around the first shafts 24 and the second shaft so as to widen the interval between the magnetic pole teeth after it is contracted rectilinearly, the core segment linked body 10A can be held stably in a state in which the interval between the magnetic pole teeth is widened. Mounting of the coils is thereby facilitated.

Moreover, core segments that do not have gaps between side and end portions of adjacent first through fourth core laminations can also be configured by using a combination of: second and fourth core laminations that have elastically deforming portions on any longitudinal end portion of the back yoke portions in Embodiment 5 or Embodiment 6; and first and third core laminations that have elastically deforming portions on any longitudinal end portion of the back yoke portions in Embodiment 7 or Embodiment 8.

Embodiment 9

Figure 25:
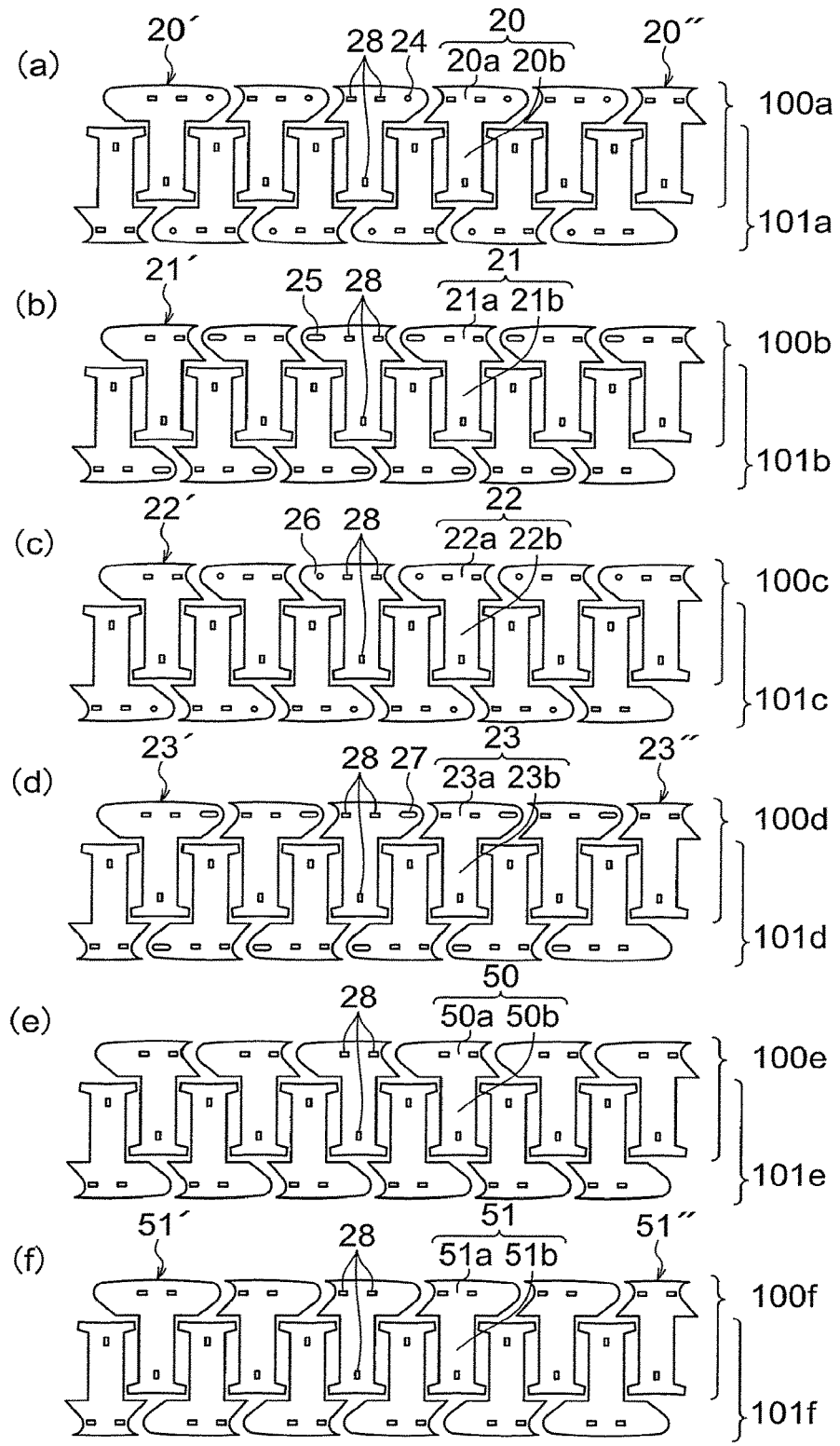
FIG. 25 is shows diagrams that explain materials yield of core laminations that constitute part of a core segment linked body of a rotary electric machine according to Embodiment 9 of the present invention.

FIG. 25 shows diagrams that explain materials yield of core laminations that constitute part of a core segment linked body of a rotary electric machine according to Embodiment 9 of the present invention.

As shown in FIG. 25, core segments in Embodiment 9 are constituted by: first core laminations 20, 20', and 20"; second core laminations 21 and 21'; third core laminations 22 and 22'; fourth core laminations 23, 23', and 23"; fifth core laminations 50; and sixth core laminations 51, 51', and 51". Because configurations of the first core laminations 20, 20', and 20", the second core laminations 21 and 21', the third core laminations 22 and 22', and the fourth core laminations 23, 23', and 23" are similar or identical to those of Embodiment 1 above, explanation thereof will be omitted here.

The fifth core laminations 50, as shown in FIG. 25(*e*), are formed so as to have an approximate T shape that has: a fifth back yoke portion 50a; and a fifth magnetic pole tooth portion 50b that protrudes from a longitudinally central portion of the fifth back yoke portion 50a. A first longitudinal end portion of the fifth back yoke portion 50a is hollowed out concavely, and a second end portion bulges outward convexly. A plurality of crimping portions 28 are formed on the fifth back yoke portion 50a and the fifth magnetic pole tooth portion 50b. Moreover, the fifth core laminations 50 are configured in a similar or identical manner to the third core laminations 22 except that the second shaft 26 is omitted.

The sixth core laminations 51, as shown in FIG. 25(*f*), are formed so as to have an approximate T shape that has: a sixth back yoke portion 51a; and a sixth magnetic pole tooth portion 51b that protrudes from a longitudinally central portion of the sixth back yoke portion 51a. A vicinity of a first longitudinal end of the sixth back yoke portion 51a bulges outward convexly, and a second longitudinal end portion is hollowed out concavely. A plurality of crimping portions 28 are formed on the sixth back yoke portion 51a and the sixth magnetic pole tooth portion 51b. The sixth core laminations 51' are configured in a similar or identical manner to the fourth core laminations 23 except that the second slot 27 is omitted.

The sixth core laminations 51' are configured in a similar or identical manner to the sixth core laminations 51 except that a second longitudinal end portion of a sixth back yoke portion 51a thereof bulges outward convexly. The sixth core laminations 51" are configured in a similar or identical manner to the sixth core laminations 51 except that a first longitudinal end portion of a sixth back yoke portion 51a thereof is hollowed out concavely.

First core segments are configured by laminating and integrating a laminated body of first core laminations 20, second core laminations 21, third core laminations 22, fourth core laminations 23, fifth core laminations 50, and sixth core laminations 51 in a plurality of layers.

Second core segments are configured by laminating and integrating a laminated body of first core laminations 20', second core laminations 21', third core laminations 22', fourth core laminations 23', fifth core laminations 50, and sixth core laminations 51' in a plurality of layers.

Third core segments are configured by laminating and integrating a laminated body of first core laminations 20", second core laminations 21, third core laminations 22, fourth core laminations 23", fifth core laminations 50, and sixth core laminations 51" in a plurality of layers.

As shown in FIG. 25(a), the first core laminations 20, 20', and 20" are punched out from a sheet of magnetic steel plate so as to form an arrangement known as a "staggered straight row pair" in which core lamination groups 100a and 101a are disposed in opposite directions such that the first magnetic pole tooth portions 20b of the core lamination group 100a are placed between the first magnetic pole tooth portions 20b of the core lamination group 101a.

As shown in FIG. 25(b), the second core laminations 21 and 21' are punched out from a sheet of magnetic steel plate so as to form an arrangement known as a "staggered straight row pair" in which core lamination groups 100b and 101b are disposed in opposite directions such that the second magnetic pole tooth portions 21b of the core lamination group 100b are placed between the second magnetic pole tooth portions 21b of the core lamination group 101b.

Similarly, as shown in FIG. 25(c), the third core laminations 22 and 22' are punched out from a sheet of magnetic steel plate so as to form an arrangement known as a "staggered straight row pair" in which core lamination groups 100c and 101c are disposed in opposite directions such that the third magnetic pole tooth portions 22b of the core lamination group 100c are placed between the third magnetic pole tooth portions 22b of the core lamination group 101c.

Similarly, as shown in FIG. 25(d), the fourth core laminations 23, 23', and 23" are punched out from a sheet of magnetic steel plate so as to form an arrangement known as a "staggered straight row pair" in which core lamination groups 100d and 101d are disposed in opposite directions such that the fourth magnetic pole tooth portions 23b of the core lamination group 100d are placed between the fourth magnetic pole tooth portions 23b of the core lamination group 101d.

As shown in FIG. 25(e), the fifth core laminations 50 are punched out from a sheet of magnetic steel plate so as to form an arrangement known as a "staggered straight row pair" in which core lamination groups 100e and 101e that are lined up in single columns in a longitudinal direction of the fifth back yoke portions 50a such that the fifth magnetic pole tooth portions 50b are parallel are disposed in opposite directions such that the fifth magnetic pole tooth portions 50b of the core lamination group 100e are placed between the fifth magnetic pole tooth portions 50b of the core lamination group 101e.

As shown in FIG. 25(f), the sixth core laminations 51, 51', and 51" are punched out from a sheet of magnetic steel plate so as to form an arrangement known as a "staggered straight row pair" in which core lamination groups 100b and 101b that are lined up in single columns in a longitudinal direction of the sixth back yoke portions 51a such that the sixth magnetic pole tooth portions 51b are parallel are disposed in opposite directions such that the sixth magnetic pole tooth portions 51b of the core lamination group 100f are placed between the sixth magnetic pole tooth portions 51b of the core lamination group 101f.

Moreover, the respective first through sixth core laminations of the core lamination groups 100a, 100b, 100c, 100d, 100e, 100f, 101a, 101b, 101c, 101d, 101e, and 101f are arranged rectilinearly at a spacing that corresponds to when the core segment linked bodies are positioned in an expanded position.

The core lamination groups 100a, 100b, 100c, 101d, 100e, and 100f and the core lamination groups 101a, 101b, 101c, 100d, 101e, and 101f are punched out in an identical die in this manner, are stacked in an identical die, and are fixed by crimping at the crimping portions 28 to produce a core lamination linked body. A required number of the core lamination linked bodies are then stacked, and are fixed by crimping at the crimping portions 28 to produce a core segment linked body.

Here, the first through sixth core laminations 20, 21, 22, 23, 50, and 51 are stacked sequentially in order of a fifth core lamination 50, a sixth core lamination 51, a third core lamination 22, a fourth core lamination 23, a first core lamination 20, and a second core lamination 21 such that the first through sixth back yoke portions 20a, 21a, 22a, 23a, 50a, and 51a and the first through sixth magnetic pole tooth portions 20b, 21b, 22b, 23b, 50b, and 51b are stacked. This operation is performed repeatedly, and the first core segment is formed by fixing the stacked plurality of first through sixth core laminations 20 through 23, 50, and 51 by crimping at the crimping portions 28.

The first through sixth core laminations 20', 21', 22', 23', 50, and 51' are stacked sequentially in order of a fifth core lamination 50, a sixth core lamination 51', a third core lamination 22', a fourth core lamination 23', a first core lamination 20', and a second core lamination 21' such that the first through sixth back yoke portions 20a, 21a, 22a, 23a, 50a, and 51a and the first through sixth magnetic pole tooth portions 20b, 21b, 22b, 23b, 50b, and 51b are stacked. This operation is performed repeatedly, and the second core segment is formed by fixing the stacked plurality of first through sixth core laminations 20', 21', 22', and 23', 50, and 51' by crimping at the crimping portions 28.

The first through sixth core laminations 20", 21, 22, 23", 50, and 51" are stacked sequentially in order of a fifth core lamination 50, a sixth core lamination 51", a third core lamination 22, a fourth core lamination 23", a first core lamination 20", and a second core lamination 21 such that the first through sixth back yoke portions 20a, 21a, 22a, 23a, 50a, and 51a and the first through sixth magnetic pole tooth portions 20b, 21b, 22b, 23b, 50b, and 51b are stacked. This operation is performed repeatedly, and the third core segment is formed by fixing the stacked plurality of first through sixth core laminations 20", 21, 22, 23", 50, and 51" by crimping at the crimping portions 28.

The first core segments are linked together by inserting the first shafts 24 into the first slots 25, and inserting the second shafts 26 into the second slots 27. The second core segment 12 and a first core segment 11, and a first core segment 11 and the third core segment 13, are also linked by the first shafts 24 being inserted into the first slots 25, and by the second shafts 26 being inserted into the second slots 27.

In the core segment linked bodies that are configured in this manner, the linked first through third core segments expand rectilinearly and enter the expanded position by the first shafts 24 being placed in contact with the second end portions of the first slots 25, and the second shafts 26 being placed in contact with the first end portions of the second slots 27, in a similar or identical manner to the core segment linked bodies 10 in Embodiment 1 above. The first through third core segments of the core segment linked bodies contract and enter the contracted position by the first shafts 24 being placed in contact with the first end portions of the first slots 25, and the second shafts 26 being placed in contact with the second end portions of the second slots 27. Here, the first through third core segments are pivotable around the first shafts 24 and the second shafts 26.

Consequently, similar or identical effects to those of Embodiment 1 above can also be achieved in Embodiment 9.

Moreover, in Embodiment 9 above, the first through third core segments are each produced by laminating pairs of first and second core laminations, pairs of third and fourth core laminations, and pairs of fifth and sixth core laminations so as to be repeated in that order, but it is not necessary to laminate the pairs of first and second core laminations, pairs of third and fourth core laminations, and pairs of fifth and sixth core laminations so as to be repeated in that order, and the first through third core segments may be produced by continuously laminating pairs of first and second core laminations, then continuously laminating pairs of third and fourth core laminations, and then continuously laminating pairs of fifth and sixth core laminations, for example. In addition, it is also not necessary to make the number of pairs of first and second core laminations, the number of pairs of third and fourth core laminations, and the number of pairs of fifth and sixth core laminations in the first through third core segments equal. In other words, the first through third core segments need only have one or more of each of the three types of pairs, i.e., the pairs of first and second core laminations, the pairs of third and fourth core laminations, and the pairs of fifth and sixth core laminations, and may be configured by stacking these in any order.

In each of the above embodiments, the first and second slots are formed so as to have rectilinear, circular arc-shaped, or approximately V-shaped aperture shapes, but the aperture shapes of the first and second slots are not limited to being rectilinear, circular arc-shaped, or approximately V-shaped. In other words, in the state in which the core segment linked bodies are positioned in the contracted position, when the first slots are projected in the axial direction of the first and second shafts onto a common plane with the second slots, the first slots and the second slots on the projected plane need only have a point-symmetrical aperture shape that has a point of intersection between the central axes of the first and second shafts and the projected plane as a center of symmetry.

The invention claimed is:

1. A rotary electric machine armature core comprising a core segment linked body that is configured by linking a plurality of core segments that each comprise a back yoke and a magnetic pole tooth that protrudes from a central portion of said back yoke, wherein:
    said core segments are configured by laminating and integrating a plurality of core laminations that have a back yoke portion and a magnetic pole tooth portion;
    said back yoke is configured by stacking and integrating said back yoke portions;
    said magnetic pole tooth is configured by stacking and integrating said magnetic pole tooth portions;
    said core laminations have at least:
        a first core lamination on which a first shaft is formed near a first longitudinal end of said back yoke portion;
        a second core lamination on which a first slot is formed near a second longitudinal end of said back yoke portion;
        a third core lamination on which a second shaft is formed near a second longitudinal end of said back yoke portion; and
        a fourth core lamination on which a second slot is formed near a first longitudinal end of said back yoke portion;
    said core segment linked body is configured by linking a plurality of said core segments by inserting said first shafts of first core segments into said first slots of adjacent core segments near a first longitudinal end of said back yoke, and inserting said second shafts of said adjacent core segments near said first longitudinal end of said back yoke into said second slots of said first core segments;
    said linked core segments are expandable and contractible between an expanded position in which an interval between said magnetic pole tooth is expanded and a contracted position in which said interval is reduced by said first shafts being guided by said first slots and said second shafts being guided by said second slots; and
    central axes of said first shafts and said second shafts are:
        offset in a longitudinal direction of said back yoke in said expanded position; and
        positioned collinearly in a direction of lamination in said contracted position.

2. The rotary electric machine armature core according to claim 1, wherein said linked core segments are configured so as to enter a press-fitted state during a process of being contracted from said expanded position to said contracted position, and so as to be subsequently released from said press-fitted state to enter said contracted position.

3. The rotary electric machine armature core according to claim 2, wherein:
    at least one core lamination of said first core lamination, said second core lamination, said third core lamination, and said fourth core lamination comprises a first protruding portion and a second protruding portion that are formed on two longitudinal side portions of said back yoke portion; and
    said linked core segments are configured such that, during said process of contracting from said expanded position to said contracted position, said first protruding portion that is formed on a first longitudinal side portion of said back yoke portion of at least one of said core laminations of a first core segment enters said press-fitted state with said second protruding portion that is formed on a second longitudinal side portion of said back yoke portion of at least one of said core laminations of a second core segment, and is subsequently released from said press-fitted state with said second protruding portion to enter said contracted position.

4. The rotary electric machine armature core according to claim 3, wherein: a penetrating aperture is formed on said back yoke portion of at least one of said core laminations so as to be in close proximity to at least one of said first protruding portion and said second protruding portion, and an aperture shape of said penetrating aperture is configured so as to deform during said press-fitted state of said first protruding portion and said second protruding portion.

5. The rotary electric machine armature core according to claim 2, wherein:
said first slots and said second slots are formed so as to have aperture shapes that guide said first shafts and said second shafts so as to move additionally by a first amount of movement in a longitudinal direction of said back yoke portion beyond said contracted position from said expanded position, and then to return by said first amount of movement toward said expanded position to reach said contracted position;
a first aperture is formed on a second side of said first slot of said back yoke portion of said second core lamination to configure a first elastically deforming portion between a second longitudinal end portion of said back yoke portion of said second core lamination and said first aperture;
a second aperture is formed on a first side of said second slot of said back yoke portion of said fourth core lamination to configure a second elastically deforming portion between a first longitudinal end portion of said back yoke portion of said fourth core lamination and said second aperture; and
said linked core segments are configured so as to enter a press-fitted state during a process of moving by said first amount of movement after exceeding said contracted position from said expanded position by said first elastically deforming portion and said second elastically deforming portion deforming elastically, and to enter said contracted position during a process of returning toward said expanded position by said first amount of movement by said first elastically deforming portion and said second elastically deforming portion recovering and being released from said press-fitted state.

6. The rotary electric machine armature core according to claim 2, wherein:
said first slots and said second slots are formed so as to have aperture shapes that guide said first shafts and said second shafts so as to move additionally by a first amount of movement in a longitudinal direction of said back yoke portion beyond said contracted position from said expanded position, and then return by said first amount of movement toward said expanded position to reach said contracted position;
a first aperture is formed near a first longitudinal end of said back yoke portion of said second core lamination to configure a first elastically deforming portion between a first longitudinal end portion of said back yoke portion of said second core lamination and said first aperture;
a second aperture is formed near a second longitudinal end of said second slot of said back yoke portion of said fourth core lamination to configure a second elastically deforming portion between a second longitudinal end portion of said back yoke portion of said fourth core lamination and said second aperture; and
said linked core segments are configured so as to enter a press-fitted state during a process of moving by said first amount of movement after exceeding said contracted position from said expanded position by said first elastically deforming portion and said second elastically deforming portion deforming elastically, and to enter said contracted position during a process of returning toward said expanded position by said first amount of movement by said first elastically deforming portion and said second elastically deforming portion recovering and being released from said press-fitted state.

7. The rotary electric machine armature core according to claim 2, wherein:
said first slots and said second slots are formed so as to have aperture shapes that guide said first shafts and said second shafts so as to move additionally by a first amount of movement in a longitudinal direction of said back yoke portion beyond said contracted position from said expanded position, and then return by said first amount of movement toward said expanded position to reach said contracted position;
a first aperture is formed on a first side of said first shaft portion of said back yoke portion of said first core lamination to configure a first elastically deforming portion between a first longitudinal end portion of said back yoke portion of said first core lamination and said first aperture;
a second aperture is formed on a second side of said second shaft portion of said back yoke portion of said third core lamination to configure a second elastically deforming portion between a second longitudinal end portion of said back yoke portion of said third core lamination and said second aperture; and
said linked core segments are configured so as to enter a press-fitted state during a process of moving by said first amount of movement after exceeding said contracted position from said expanded position by said first elastically deforming portion and said second elastically deforming portion deforming elastically, and to enter said contracted position during a process of returning toward said expanded position by said first amount of movement by said first elastically deforming portion and said second elastically deforming portion recovering and being released from said press-fitted state.

8. The rotary electric machine armature core according to claim 2, wherein:
said first slots and said second slots are formed so as to have aperture shapes that guide said first shafts and said second shafts so as to move additionally by a first amount of movement in a longitudinal direction of said back yoke portion beyond said contracted position from said expanded position, and then return by said first amount of movement toward said expanded position to reach said contracted position;
a first aperture is formed near a second longitudinal end of said back yoke portion of said first core lamination to configure a first elastically deforming portion between a second longitudinal end portion of said back yoke portion of said first core lamination and said first aperture;
a second aperture is formed near a first longitudinal end of said second slot of said back yoke portion of said third core lamination to configure a second elastically deforming portion between a first longitudinal end portion of said back yoke portion of said third core lamination and said second aperture; and
said linked core segments are configured so as to enter a press-fitted state during a process of moving by said first amount of movement after exceeding said contracted position from said expanded position by said first elastically deforming portion and said second elastically deforming portion deforming elastically, and to enter said contracted position during a process of returning toward said expanded position by said first amount of movement by said first elastically deforming portion and said second elastically deforming portion recovering and being released from said press-fitted state.

9. The rotary electric machine armature core according to claim 1, wherein when said first slots of said linked core segments that are positioned in said contracted position are projected from an axial direction of said first shafts and said second shafts onto a common plane with said second slots, said first slots and said second slots on said projected plane have a point-symmetrical aperture shape that has a point of intersection between central axes of said first shafts and said second shafts and said projected plane as a center of symmetry.

10. The rotary electric machine armature core according to claim 1, wherein said linked core segments that are positioned in said contracted position comprise a pivoting restricting portion that limits to a set pivoting range pivoting around a central axis of said first shaft and said second shaft in a direction in which spacing between tip ends of said magnetic pole teeth is narrowed or is widened.

* * * * *